(12) United States Patent
Farnik et al.

(10) Patent No.: US 10,678,220 B2
(45) Date of Patent: Jun. 9, 2020

(54) FOLLOW SPOT CONTROL SYSTEM

(71) Applicant: Robe Lighting s.r.o., Roznov pod Radhostem (CZ)

(72) Inventors: Martin Farnik, Roznov pod Radhostem (CZ); Pavel Jurik, Prostredni Becva (CZ); Josef Valchar, Prostredni Becva (CZ); Jindrich Vavrik, Zubri (CZ); Jiri Zatopek, Valasske Mezirici (CZ)

(73) Assignee: Robe Lighting s.r.o., Roznov pod Radhostem (CZ)

( * ) Notice: Subject to any disclaimer, the term of this patent is extended or adjusted under 35 U.S.C. 154(b) by 0 days.

(21) Appl. No.: 16/004,223

(22) Filed: Jun. 8, 2018

(65) Prior Publication Data
US 2018/0292809 A1 Oct. 11, 2018

Related U.S. Application Data

(63) Continuation-in-part of application No. 15/944,487, filed on Apr. 3, 2018.
(Continued)

(51) Int. Cl.
*G05B 19/416* (2006.01)
*F21V 21/15* (2006.01)
(Continued)

(52) U.S. Cl.
CPC ............ *G05B 19/416* (2013.01); *F21V 21/15* (2013.01); *F21W 2131/406* (2013.01); *G05B 2219/36447* (2013.01)

(58) Field of Classification Search
CPC .............. H05B 37/029; H05B 33/0863; H05B 37/0245; H05B 37/02; H05B 37/0227;
(Continued)

(56) References Cited

U.S. PATENT DOCUMENTS

| 4,527,198 A | 7/1985 | Callahan |
| 4,947,302 A * | 8/1990 | Callahan ............... H05B 37/029 |
| | | 315/312 |

(Continued)

FOREIGN PATENT DOCUMENTS

| CN | 202353867 U | 7/2012 |
| CN | 203086829 U | 7/2013 |

(Continued)

OTHER PUBLICATIONS

Farnik, Martin, et al.; U.S. Appl. No. 15/944,487, filed Apr. 3, 2018; Title: Follow Spot Control System; 34 pages.
(Continued)

*Primary Examiner* — Wei (Victor) Y Chan
(74) *Attorney, Agent, or Firm* — Conley Rose, P.C.; Grant Rodolph; Brooks W Taylor

(57) ABSTRACT

A follow spot controller and method are provided that store first and second sets of individual pan and tilt parameters for each of a plurality of automated luminaires and calibrate a 3-D model of a surface of a performance area and location and mounting orientations of the automated luminaires relative to the performance area, based on the stored sets of individual pan and tilt parameters. A physical orientation of the follow spot controller is sensed and operator pan and tilt parameters are sent to one of the automated luminaires. The operator pan and tilt parameters are based on the physical orientation of the follow spot controller. Individual calculated pan and tilt parameters are sent to each of the other automated luminaires. The individual calculated pan and tilt parameters are based on the operator pan and tilt parameters and the 3-D model.

20 Claims, 16 Drawing Sheets

Related U.S. Application Data

(60) Provisional application No. 62/480,967, filed on Apr. 3, 2017.

(51) Int. Cl.
*F21W 131/406* (2006.01)
*H05B 47/105* (2020.01)
*H05B 47/155* (2020.01)
*H05B 47/175* (2020.01)

(58) Field of Classification Search
CPC .............. F21Y 2115/10; F21Y 2107/50; F21Y 2113/17; F21S 10/026; F21V 14/02; F21V 1/00; F21V 23/0435; F21V 29/74; F21V 21/15
USPC ........ 315/292, 131, 291, 297, 307, 308, 312
See application file for complete search history.

(56) References Cited

U.S. PATENT DOCUMENTS

| | | | |
|---|---|---|---|
| 5,023,709 A | 6/1991 | Kita et al. | |
| 6,079,862 A | 6/2000 | Kawashima et al. | |
| 6,331,756 B1 | 12/2001 | Belliveau | |
| 7,354,304 B2* | 4/2008 | Livingston | A45F 5/00 439/501 |
| 8,201,974 B1 | 6/2012 | Smith et al. | |
| 9,526,156 B2 | 12/2016 | LaDuke et al. | |
| 9,593,830 B2 | 3/2017 | Conti et al. | |
| 2009/0144646 A1* | 6/2009 | Reese | G06F 3/04847 715/771 |
| 2009/0146982 A1 | 6/2009 | Thielman et al. | |
| 2010/0181938 A1* | 7/2010 | Boleko Ribas | H05B 37/0245 315/312 |
| 2011/0285854 A1* | 11/2011 | LaDuke | G01S 11/00 348/169 |
| 2012/0126722 A1* | 5/2012 | Archdale | H05B 37/029 315/312 |
| 2013/0128054 A1* | 5/2013 | Densham | H04N 5/23296 348/169 |
| 2013/0155672 A1 | 6/2013 | Vo et al. | |
| 2014/0343699 A1* | 11/2014 | Engelen | F21V 23/003 700/90 |
| 2015/0003084 A1* | 1/2015 | Eichel | F21V 21/14 362/419 |
| 2015/0016106 A1* | 1/2015 | Belliveau | F21V 14/02 362/233 |
| 2015/0048233 A1* | 2/2015 | Dumas | F16M 11/32 248/550 |
| 2015/0084514 A1* | 3/2015 | Anthony | H05B 33/0863 315/131 |
| 2015/0091446 A1 | 4/2015 | Ohta et al. | |
| 2015/0345762 A1* | 12/2015 | Creasman | F21S 8/038 362/428 |
| 2016/0112652 A1* | 4/2016 | David | H04N 1/3877 348/239 |
| 2016/0178991 A1 | 6/2016 | Wan et al. | |
| 2017/0009969 A1 | 1/2017 | Conti et al. | |
| 2017/0045211 A1 | 2/2017 | Conti et al. | |
| 2017/0068237 A1* | 3/2017 | Yamaguchi | G05B 19/0426 |
| 2017/0138730 A1* | 5/2017 | Ohtomo | G01C 3/08 |
| 2018/0051869 A1* | 2/2018 | Belliveau | F21V 21/15 |
| 2018/0160507 A1 | 6/2018 | Feeney | |
| 2019/0029088 A1* | 1/2019 | Clout | H05B 33/0863 |

FOREIGN PATENT DOCUMENTS

| | | |
|---|---|---|
| GB | 2535909 A | 8/2016 |
| WO | 2008104927 A2 | 9/2008 |
| WO | 2017008023 A1 | 1/2017 |

OTHER PUBLICATIONS

Farnik, Martin, et al.; U.S. Appl. No. 15/944,498, filed Apr. 3, 2018; Title: Follow Spot Control System; 31 pages.
Office Action dated Sep. 20, 2018; U.S. Appl. No. 15/944,498, filed Apr. 3, 2018; 20 pages.
Farnik, Martin, et al.; U.S. Appl. No. 16/188,475, filed Nov. 13, 2018; Title: Follow Spot control System; 50 pages.
Office Action dated Sep. 19, 2018; U.S. Appl. No. 15/944,487, filed Apr. 3, 2018; 44 pages.
Office Action dated Jul. 12, 2018; U.S. Appl. No. 15/944,487, filed Apr. 3, 2018; 6 pages.
Office Action dated Jun. 28, 2018; U.S. Appl. No. 15/944,498, filed Apr. 3, 2018; 6 pages.
Final Office Action dated Jan. 22, 2019; U.S. Appl. No. 15/944,487, filed Apr. 3, 2018; 42 pages.
Advisory Action dated Mar. 26, 2019; U.S. Appl. No. 15/944,487, filed Apr. 3, 2018; 3 pages.
Office Action dated Jan. 22, 2019; U.S. Appl. No. 15/944,498, filed Apr. 3, 2018; 23 pages.
Office Action dated Jan. 22, 2019; U.S. Appl. No. 16/188,475, filed Nov. 13, 2018; 31 pages.
European Examination Report; Application No. 18165531.7; dated Mar. 5, 2019; 4 pages.
Office Action dated May 2, 2019; U.S. Appl. No. 15/944,487, filed Apr. 3, 2018; 41 pages.
Final Office Action dated May 2, 2019; U.S. Appl. No. 15/944,498, filed Apr. 3, 2018; 21 pages.
Advisory Action dated Jun. 27, 2019; U.S. Appl. No. 15/944,498, filed Apr. 3, 2018; 6 pages.
Final Office Action dated May 2, 2019; U.S. Appl. No. 16/188,475, filed Nov. 13, 2018; 33 pages.
Advisory Action dated Jul. 3, 2019; U.S. Appl. No. 16/188,475, filed Nov. 13, 2018; 3 pages.
Chinese Office Action; Application No. 201810292105.7; dated Jun. 25, 2019; 16 pages.
Final Office Action dated Aug. 19, 2019; U.S. Appl. No. 15/944,487, filed Apr. 3, 2018; 44 pages.
Notice of Allowance dated Jan. 29, 2020; U.S. Appl. No. 15/944,487, filed Apr. 3, 2018; 10 pages.
European Extended search Report; Application No. 19179007.0; dated Dec. 5, 2019; 10 pages.
Chinese Office Action; Application No. 201810292105.7; dated Mar. 31, 2020; 4 pages.

* cited by examiner

FOLLOW SPOT CONTROL SYSTEM

CROSS-REFERENCE TO RELATED APPLICATIONS

This application is a continuation in part of U.S. application Ser. No. 15/944,487 filed on Apr. 3, 2018, by Pavel Juřík, et al., entitled, "Follow Spot Control System", which claims priority to U.S. Provisional Application No. 62/480,967 filed Apr. 3, 2017, by Pavel Juřík, et al., entitled, "An Improved Follow Spot System", both of which are incorporated by reference herein as if reproduced in their entireties.

TECHNICAL FIELD

The disclosure generally relates to a method for providing a follow spot system, specifically to methods for integrating control of a follow spot with control of a lighting rig and to adding automation to such a system.

BACKGROUND

Follow spots are a well-known part of many entertainment productions and are commonly used in theatres, television studios, concerts, theme parks, night clubs and other venues. Some follow spots are manually controlled luminaires where the operator has control over the direction the luminaire is pointing, typically to illuminate a performer, and to the color, size and other optical parameters of the luminaire. A production may include many follow spots, each with its own operator, as shown in FIG. 1. In this depiction, four follow spots 60, each with attendant operator 62, are directed towards a target point 242 on a performance area 240. A performer may be situated at the target point 242 and, as that performer moves around the performance area 240, the operators 62 will move their respective follow spots 60 to keep the performer illuminated.

In such systems, the skill of the operators 62 may not be similar, e.g., some operators may be slow to follow the performer or inaccurate in their use of the follow spot. Attempting to synchronize color or intensity changes between the multiple operators may be difficult and/or inaccurate. Additionally, a lighting designer may wish to situate the follow spots in locations where it would be difficult or unsafe to place an operator. For example, above the stage or in areas where there is insufficient height or space for an operator. Even if it is possible to safely situate the operator, he may be uncomfortable and forced to remain in a cramped position for the duration of the event.

SUMMARY

In one embodiment, a follow spot controller includes a memory, a processor, and a communication interface. The processor stores in the memory first and second sets of individual pan and tilt parameters for each of a plurality of automated luminaires. The processor also calibrates a three-dimensional (3-D) model of (i) a surface of a performance area and (ii) locations and mounting orientations of the automated luminaires relative to the performance area. The calibration is based on the stored first and second sets of individual pan and tilt parameters. The processor further senses a change in a physical orientation of the follow spot controller and sends operator pan and tilt parameters to one of the automated luminaires via the communication interface. The operator pan and tilt parameters are based on the change in the physical orientation of the follow spot controller. The processor still further sends individual calculated pan and tilt parameters to each of the other automated luminaires via the communication interface. The individual calculated pan and tilt parameters are based on the operator pan and tilt parameters and the 3-D model.

In another embodiment, a method of controlling a plurality of automated luminaires includes storing in a memory first and second sets of individual pan and tilt parameters for each of the automated luminaires and calibrating a three-dimensional (3-D) model of (i) a surface of a performance area and (ii) locations and mounting orientations of the plurality of automated luminaires relative to the performance area. The calibration is based on the stored first and second sets of individual pan and tilt parameters. The method also includes sensing a change in a physical orientation of a follow spot controller and sending operator pan and tilt parameters to one of the automated luminaires. The operator pan and tilt parameters are based on the change in the physical orientation of the follow spot controller. The method further includes sending individual calculated pan and tilt parameters to each of the other automated luminaires. The individual calculated pan and tilt parameters are based on (i) the operator pan and tilt parameters of the first automated luminaire and (ii) the 3-D model.

BRIEF DESCRIPTION OF THE DRAWINGS

For a more complete understanding of this disclosure, reference is now made to the following brief description, taken in conjunction with the accompanying drawings in which like reference numerals indicate like features.

DETAILED DESCRIPTION

Preferred embodiments of the disclosure are illustrated in the figures, like numerals being used to refer to like and corresponding parts of the various drawings.

The disclosure generally relates to a method for providing remote control of a follow spot system. A physical orientation of a follow spot controller is sensed and used to control one or more automated luminaires. A three-dimensional model may be used to translate operator control of a first automated luminaire into pan and tilt control of other automated luminaires.

In recent years, it has become common to use automated luminaires on entertainment productions. These are luminaires where the pan and tilt position of the luminaire light beam can be remotely controlled from a lighting desk by an operator. Many products also provide control over other parameters such as the focus, beam size, beam shape and beam pattern. Attempts have been made in the past to combine these two technologies such that the effect of a follow spot can be achieved by using a remotely controlled automated light. However, such attempts have often failed or been less than satisfactory because of the slow response time of the system or the difficulty an operator had in accurately aiming a luminaire at a small spot on a stage and moving the light around in a manner which appears natural and organic, rather than mechanical and robotic. Jerky robotic movement is annoying to the audience, distracts them from the performer, and reduces their enjoyment of the performance.

Figure 1:
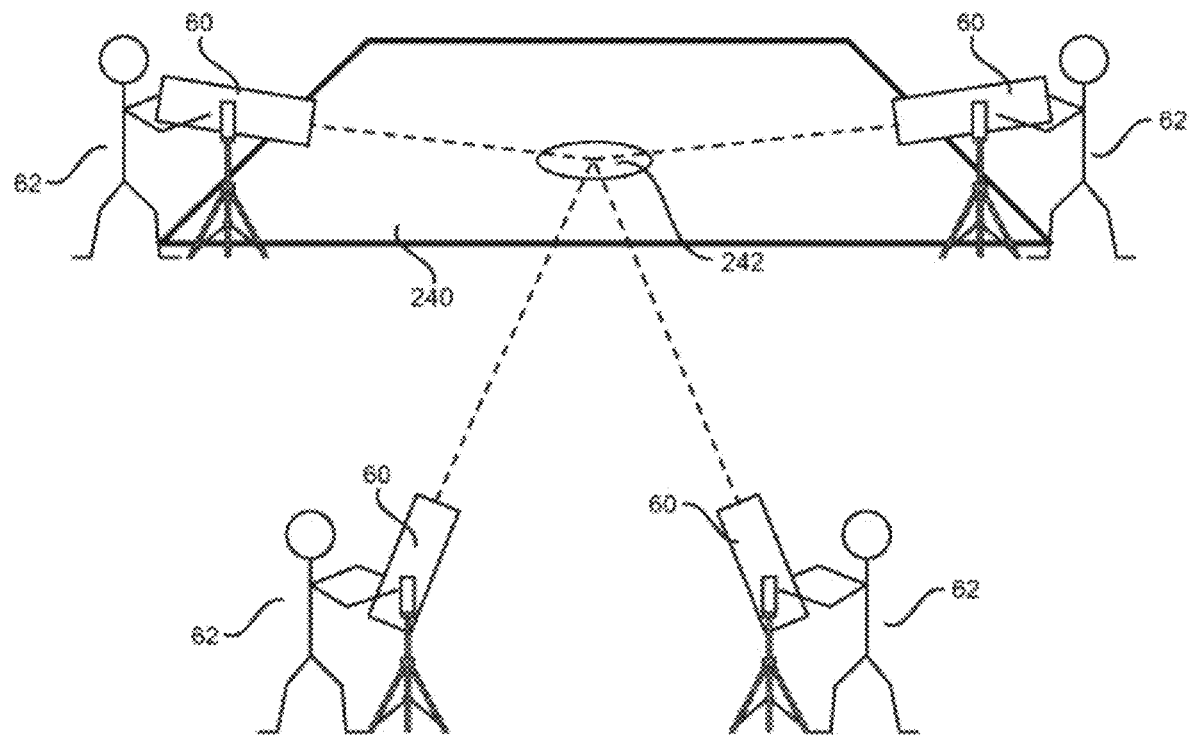
FIG. 1 illustrates a prior art follow spot system.
Figure 2:
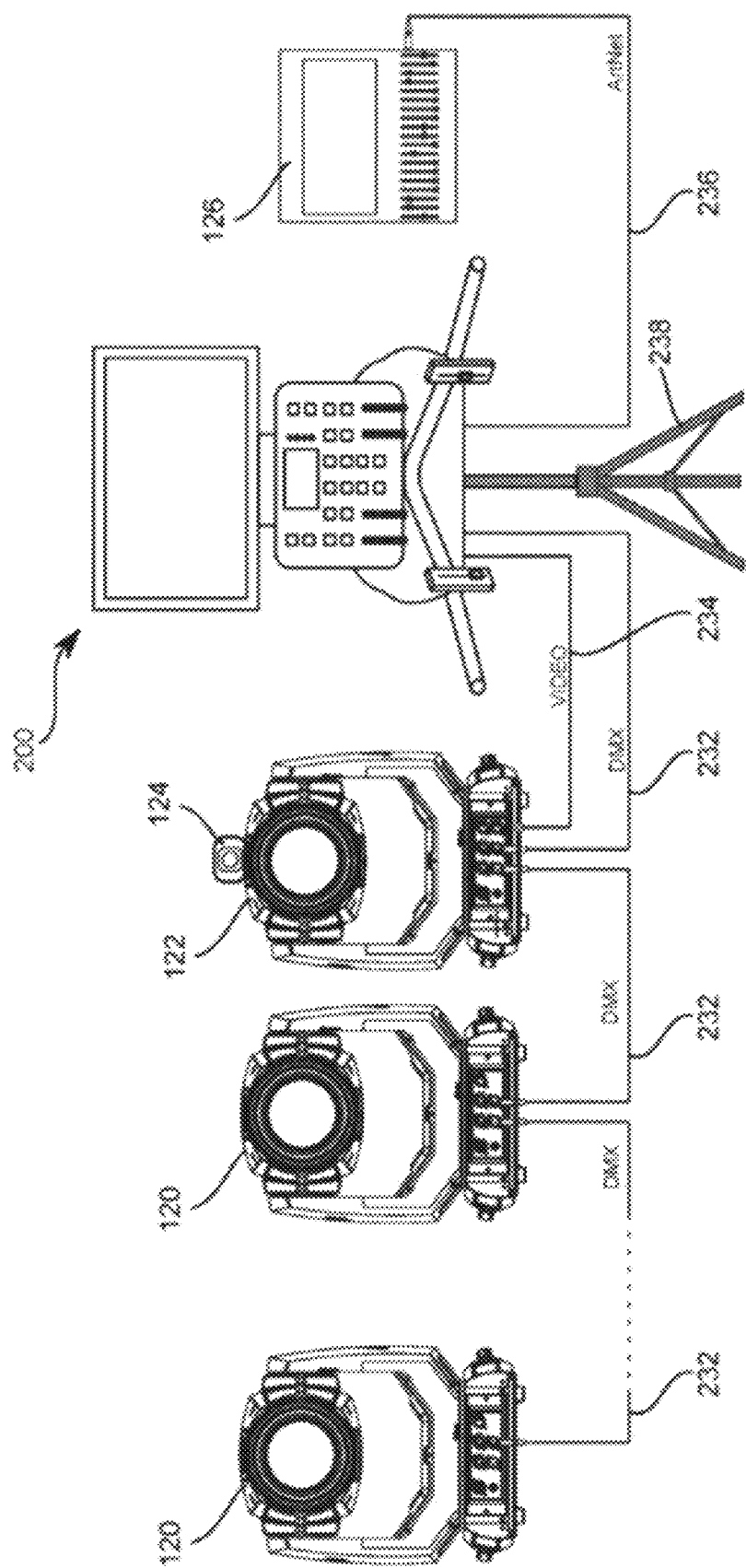
FIG. 2 illustrates the main components of an embodiment of a remotely controlled follow spot system.

FIG. 2 illustrates a first embodiment of a remotely controlled follow spot system according to the disclosure. Automated luminaires 120 and 122 are connected via a first lighting control communication link 232 to a follow spot controller (FSC) 200. In turn, FSC 200 is connected via a second lighting control communication link 236 to main lighting control desk 126. Each automated luminaire 120 may have its light output, pan and tilt position, color, beam size and other parameters controlled. First lighting control communication link 232 preferably uses DMX512 (Digital Multiplex) protocol, which is an industry standard, unidirectional communication protocol. However, the disclosure is not so limited and other communication protocols may be used, including Art-Net, ACN (Architecture for Control Networks), and Streaming ACN. Similarly, second lighting control communication link 236 is here shown as utilizing Art-Net, however the disclosure is not so limited and other communication interfaces or networks may be used. Both first and second lighting control communication links 232 and 236 may be wired, wireless, or optical communication links.

FSC 200 provides a bridge between first and second lighting control links 232 and 236 and may override or replace a limited set of parameters sent from lighting control desk 126 to automated luminaires 120. For example, FSC 200 may override just the pan and tilt parameters for one or more of the automated luminaires 120 and 122, thereby controlling which directions the automated luminaires are pointing, while lighting control desk 126 retains control of the other parameters of the automated luminaires such as light intensity, size, color, and so on. In this way, an operator of FSC 200 may concentrate solely on directing the pan and tilt parameters of one or more of the automated luminaires 120 and 122 and not be concerned about other parameters. In other embodiments, the override may include other light characteristics, such as an iris or focusing of the light beam and/or its intensity. In such embodiments, the overridden characteristics may be selectable by an operator of the FSC 200 or an operator of the control desk 126. In such embodiments, the overridden characteristics may be selected based upon cue data stored in the FSC 200 or in the control desk 126.

FSC 200 may control a single automated luminaire or may simultaneously control multiple automated luminaires. In the case where multiple automated luminaires 122 and/or 120 are being controlled, FSC 200 may substantially continuously compensate for the different locations of each of the luminaires relative to the performance area 240 and adjust the pan and tilt parameters sent to each luminaire such that each luminaire is directed to the same spot on the performance area 240 based on the pan and tilt parameters of the manually controlled follow spot. Such substantially continuous compensation is described in more detail with reference to FIGS. 6 and 9.

FSC 200 may incorporate a display screen that displays a live video signal received via communication link 234 from a camera 124 mounted on an automated luminaire 122 (or several cameras on several luminaires (not shown)). The communication link 234 may be a wired, wireless, or optical communication link. Such a live video image may allow the operator controlling FSC 200 to see the performance area 240 and the lighting and more accurately control the pan and tilt position of the automated luminaires 122 and/or 120. Such a system allows the FSC 200 to be situated in a convenient and safe location for the operator. FSC 200 may be mounted on a tripod or stand 238 to locate the FSC 200 at a comfortable height for the operator.

In some embodiments, the communication link 234 carries an analog video signal. In other embodiments, the communication link 234 is a digital communication link that carries a digital video signal. In still other embodiments, the communication link 234 may be bidirectional, allowing an operator of the FSC 200 to control set up and other parameters of the camera 124.

In further embodiments, multiple follow spot controllers 200 may be used in a single production. Each FSC 200 would have its own attendant operator and would control one or more automated luminaires 122.

Figure 3:
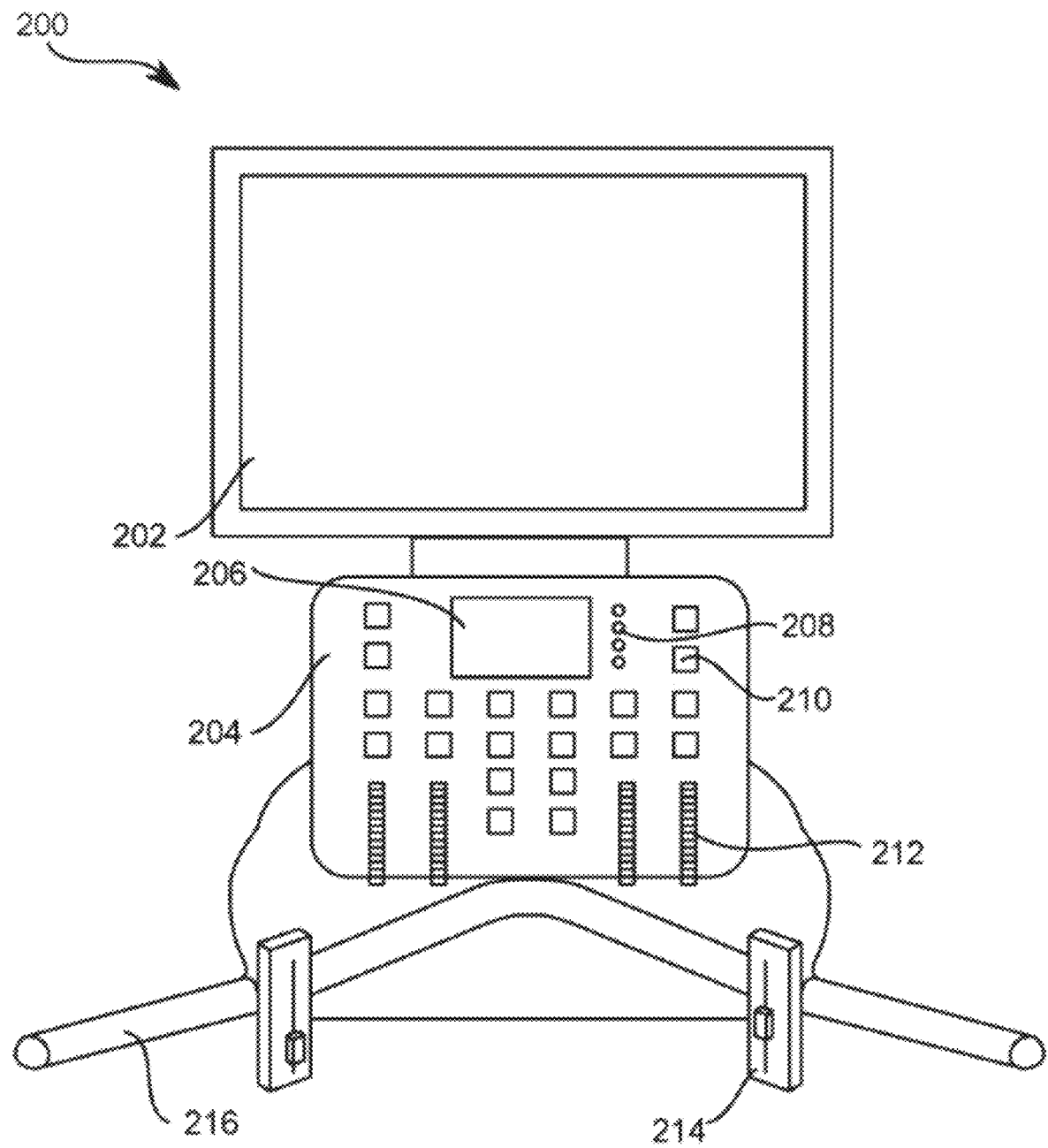
FIG. 3 illustrates an embodiment of the follow spot controller illustrated in FIG. 2.

FIG. 3 presents a schematic view of the FSC 200 of FIG. 2. The FSC 200 includes an operating handle 216, which an operator uses to move the FSC 200 to control the movement of an automated luminaire 120. The handle 216 is fitted with encoders (not shown) to provide the FSC 200 with information relating to a direction the operator has moved the handle 216 in at least pan and tilt axes of movement. In a simple system, the FSC 200 may include only the handle 216. In some embodiments, the FSC 200 includes a user-operated switch or other control that causes the FSC 200 to temporarily ignore inputs from the encoders or other motion sensors, allowing the operator to reposition the FSC 200.

In some embodiments, the FSC 200 includes additional user-operated controls such as faders or knobs 214 mounted on the handle 216, the position or other state of which controls a parameter of the automated luminaire 120 and/or 122. In other embodiments, grips of the handle 216 are user-operated controls that rotate relative to the handle 216, their rotational state providing control of other parameters, such as focus, intensity, or beam angle. Such additional controls may be assignable to any desired function (or parameter) of the automated luminaire 120. For example, one fader may control a brightness of the luminaire, while another controls a beam size. Additionally, yet further user-operated controls 212 may be provided on the console 204 and their rotational state used to control still other parameters.

In some embodiments, the console 204 provides the ability to store and recall cues containing information such as pan and tilt, color, size, or any other parameters of the luminaires under its control. The console 204 may also contain a display 206 that provides information and feedback relating to the control and working of the system, as well as function buttons 210 and indicators 208.

FSC 200 may also include a display screen 202 showing a live video image from a camera, as described earlier. In some embodiments, the operator may select between different video feeds using the control functionality of console 204.

In some embodiments, the FSC 200 is fixed in position, while in other embodiments it is gimbaled so that it can be panned and tilted to point at different locations on the performance area 240 or around the house (performance facility). In installations where the controller is located to provide the operator a direct view of the performance area 240, the operator can point the follow spots by dead reckoning while directly observing the performance area 240 by eye. In installations where the operator cannot directly view the performance area 240, the operator may rely on the display screen 202 and a camera mounted on the FSC 200, where the camera is positioned to allow a view of the performance area 240. In still other embodiments, the operator may rely on the display screen 202 and the camera 124 mounted on the automated luminaire 122.

In some embodiments, the controller does not physically move. Instead, the operator controls the follow spots' motion via a joystick or other interface device. In such embodiments, the FSC 200 and the display screen 202 are stationary, but the displayed view changes with the direction of the follow spots based on the user's manipulation of the joystick.

In other embodiments the control is combined. The follow spots' motion matches the pointing of the FSC 200 when the performer or target point 242 is viewable from the location of the controller or by the camera relied on by the controller. When the target point 242 is outside that range, the display screen 202 presents a three-dimensional (3-D) rendered view (or virtual view), allowing the follow spots to follow a performer or target point 242 that is not in view of the operator or the camera.

In some embodiments, the FSC 200 automatically or manually switches control of the luminaires 120 and/or 122 back to the main control desk 126 and then, at a later time, allows the operator of the FSC 200 to take back control of the luminaires 120 and 122.

Figure 4:
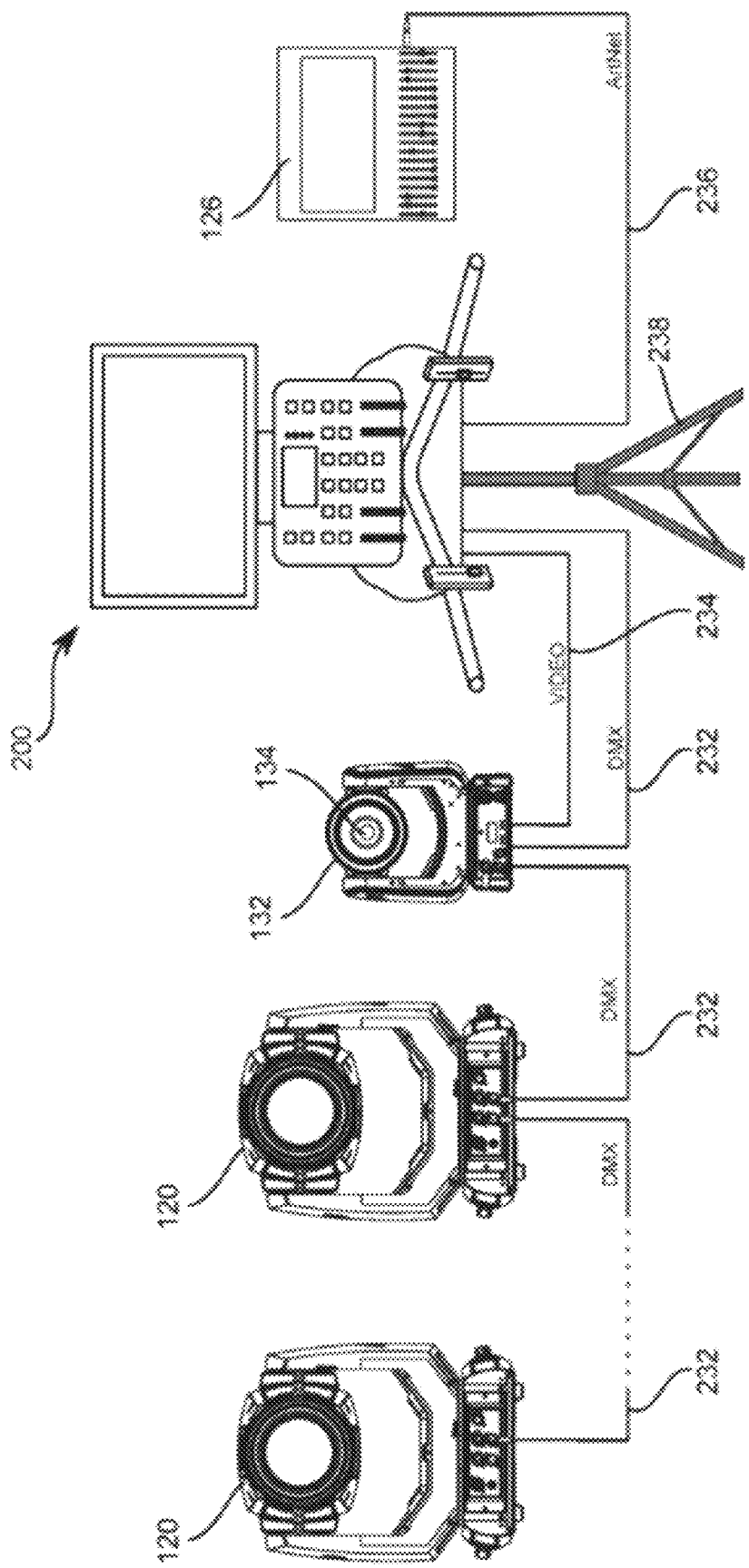
FIG. 4 illustrates the main components of a further embodiment of a remotely controlled follow spot system.

FIG. 4 illustrates a second embodiment of a remotely controlled follow spot system according to the disclosure. In this embodiment, a camera 134 is provided that is separately mounted from any automated luminaire controlled by the FSC 200. The camera 134 is mounted on a PTZ (Pan-Tilt-Zoom) system 132 such that the operator may control an orientation of the camera 134, thereby controlling a view obtained by the camera 134. In various embodiments, such control of the orientation of the camera 134 is provided by the FSC 200 or by a separate camera controller. When provided by the FSC 200, such control of the camera 134 may be provided in a separate mode of operation of the FSC 200 from a mode where the FSC 200 controls the luminaire 122.

In other embodiments, such a separately mounted camera may be mounted in a fixed orientation, providing a static view of the performance area 240.

Figure 5:
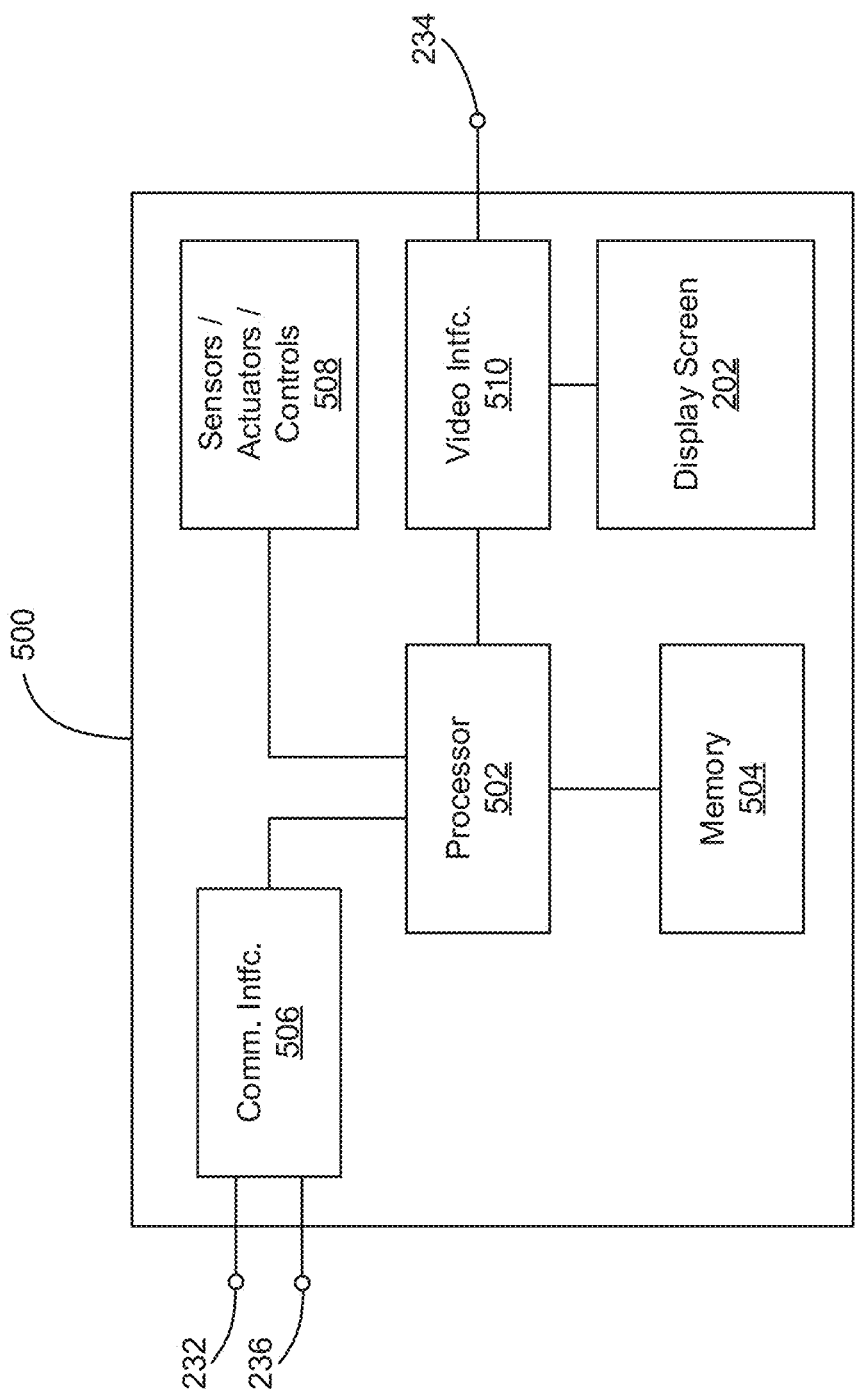
FIG. 5 presents a block diagram of a control system for a follow spot controller according to the disclosure.

FIG. 5 presents a block diagram of a control system (or controller) 500 for a follow spot controller according to the disclosure. The control system 500 is suitable for use in follow spot controllers 200, 300, or 400, as described with reference to FIGS. 3, 7, and 8, respectively. The control system 500 includes a processor 502 electrically coupled to a memory 504. The processor 502 is implemented by hardware and software. The processor 502 may be implemented as one or more Central Processing Unit (CPU) chips, cores (e.g., as a multi-core processor), field-programmable gate arrays (FPGAs), application specific integrated circuits (ASICs), and digital signal processors (DSPs).

The processor 502 is further electrically coupled to and in communication with a communication interface 506 and one or more sensors, actuators, and/or controls 508. The communication interface 506 is coupled to, and configured to communicate with, automated luminaires 120 and 122 via first lighting control communication link 232. The communication interface 506 also is coupled to, and configured to communicate with, lighting control desk 126 via second lighting control communication link 236.

The processor 502 is further electrically coupled to and in communication with a video interface 510, which is in turn electrically coupled to a video camera via communication link 234. The video interface 510 is further electrically coupled to the display screen 202.

The control system 500 is suitable for implementing processes, follow spot control, continuous compensation, and other functionality as disclosed herein, which may be implemented as instructions stored in the memory 504 and executed by the processor 502.

The memory 504 comprises one or more disks, tape drives, and/or solid-state drives and may be used as an over-flow data storage device, to store programs when such programs are selected for execution, and to store instructions and data that are read during program execution. The memory 504 may be volatile and/or non-volatile and may be read-only memory (ROM), random access memory (RAM), ternary content-addressable memory (TCAM), and/or static random-access memory (SRAM).

Figure 6:
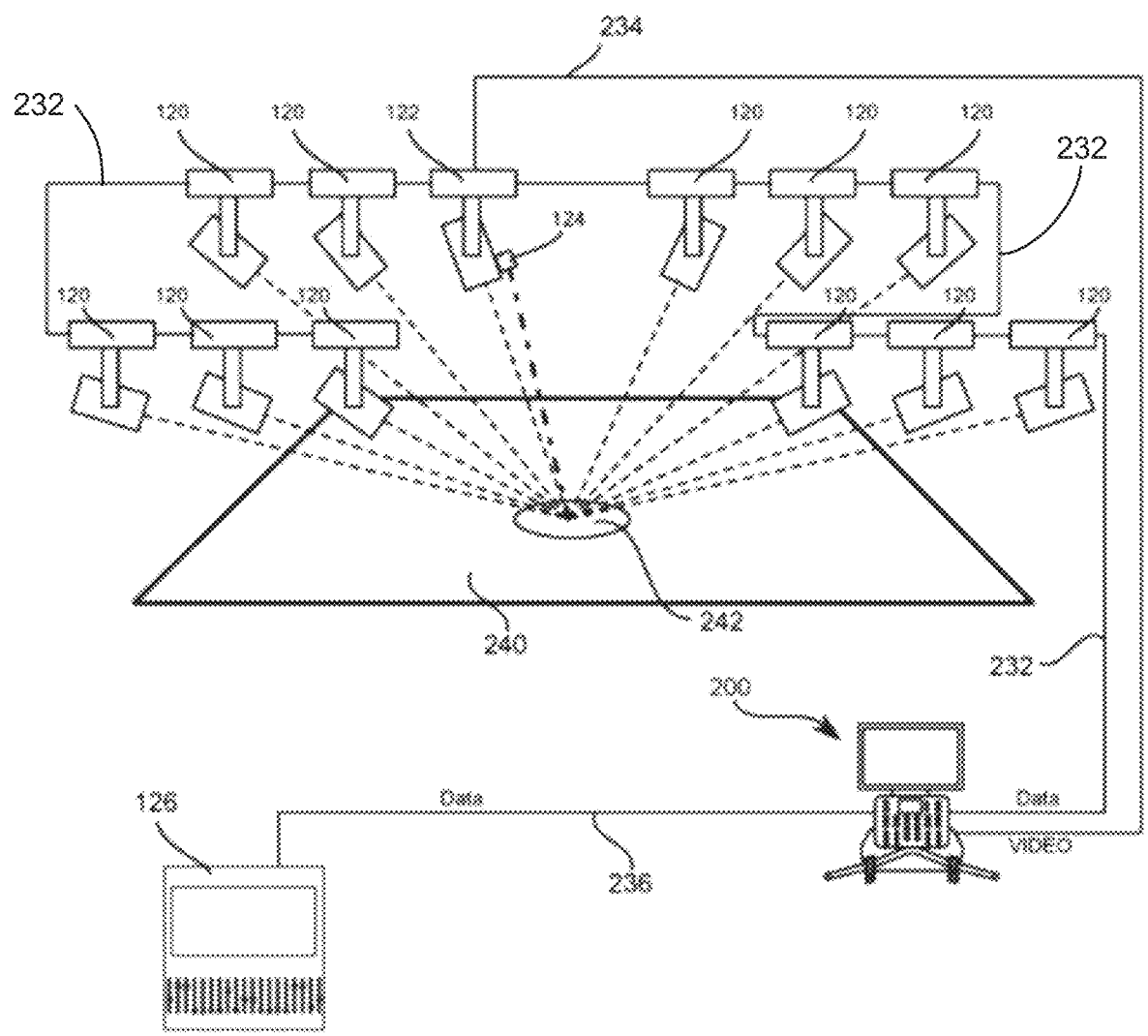
FIG. 6 illustrates a schematic of an embodiment of a complete remotely controlled follow spot system as it might be installed for a production.

FIG. 6 illustrates a schematic of a first embodiment of a remotely controlled follow spot system according to the disclosure, as it might be installed for a production. Automated luminaires 120 are rigged (or mounted) above and/or around a performance area 240. At least one luminaire 122 is fitted with a video camera 124. In other embodiments, a camera may be mounted in a PTZ system, as described with reference to FIG. 4. Control data for the luminaires 120 and 122 is routed from a lighting control desk 126 through a second lighting control communication link 236 to a FSC 200 and then via a first lighting control communication link 232 to luminaires 120 and 122. A video signal is routed back from camera 124 via communication link 234 to a display screen 202 on the FSC 200. The image from the camera 124 may be displayed directly on the display screen 202 or may be processed in the FSC 200 before being displayed.

As described previously, an operator of the FSC 200 may take over control of some, or all, of the control parameters of one or more of the luminaires 120 and 122. In particular, the FSC 200 may control the pan and tilt parameters of one or more of luminaires 120 and 122 and direct them to illuminate a target point 242 on performance area 240. In other embodiments, controls of the FSC 200 may control other parameters of one or more of the luminaires 120 and 122, e.g. brightness, focus, beam size, and/or color. Target point 242 may indicate a performer, and the operator may then move the handles on FSC 200 such that the connected luminaire or luminaires continues to illuminate the performer as he/she moves around the performance area 240.

The performance area 240 may include a stage or dais, a surrounding area, and/or some or all of the facility in which a performance takes place.

Figure 7:
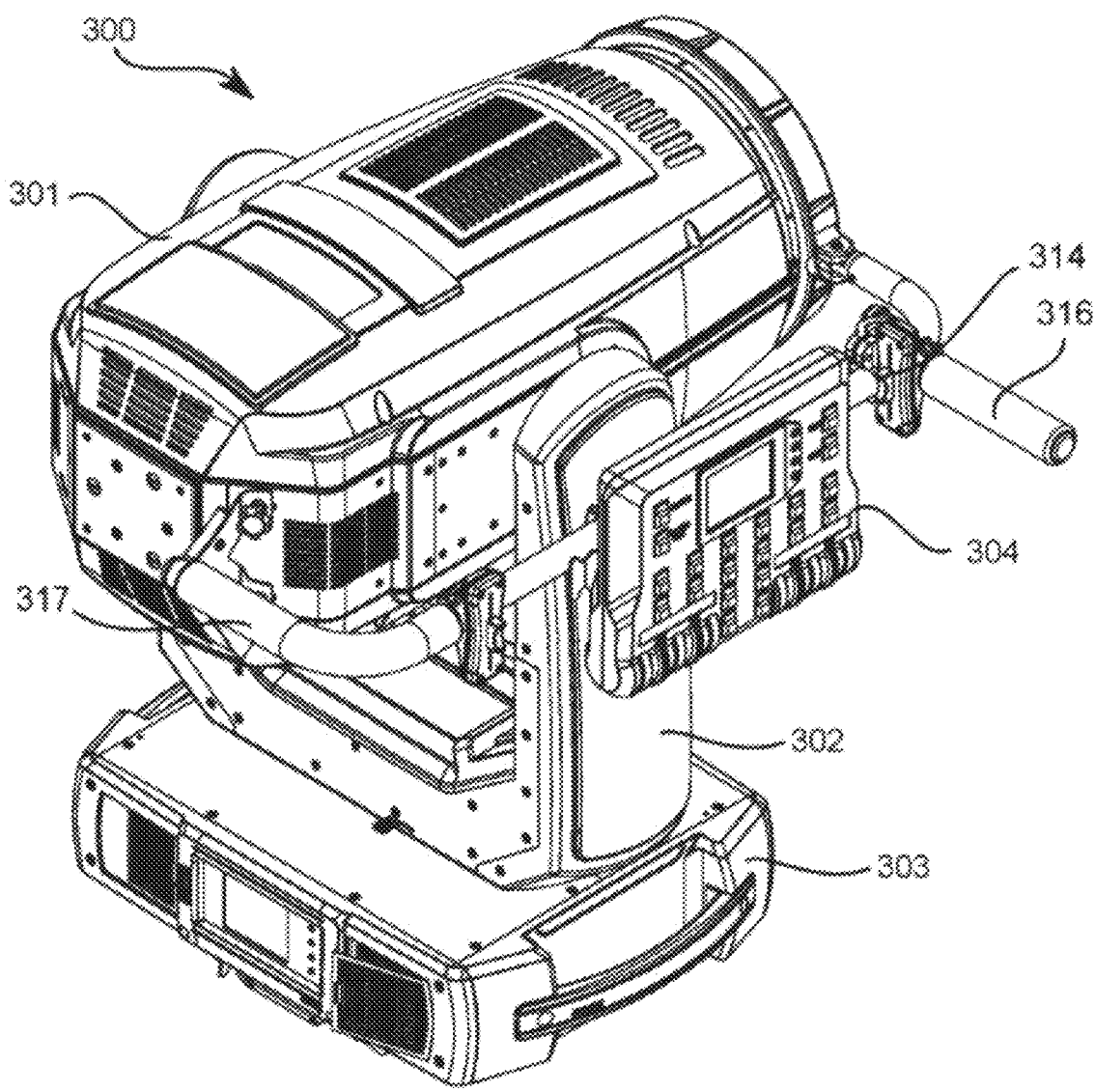
FIG. 7 illustrates an embodiment of an automated luminaire modified to be used as a follow spot or a follow spot controller.

In some embodiments, a modified automated luminaire may be used as a follow spot controller according to the disclosure. FIG. 7 illustrates a first embodiment of an automated luminaire 300 according to the disclosure, which has been modified to be used as a follow spot or as a follow spot controller. The automated luminaire 300 is a hybrid automated/manually controlled fixture. The automated luminaire 300 is modified to be used as a follow spot or a follow spot controller by a hands-on human user as he would a traditional manual follow spot. A conventional automated luminaire may be modified by adding handles 316 and 317. By overriding or disabling the internal motor drives that control "pan" motion of yoke 302, relative to base 303, and "tilt" movement of head 301, relative to yoke 302, an operator can control the pan and tilt position of automated luminaire 300 using handles 316 and 317. In some embodiments, controls 314 and console 304 provide control over further parameters of the luminaire. Such an automated luminaire may be manually controlled by the operator in the manner of a prior art follow spot.

Additionally, the automated luminaire 300 functions as a FSC 200 as described with reference to FIG. 2. In such an embodiment, sensors in the pan and tilt mechanisms of automated luminaire 300 sense the operator's movement of the automated luminaire 300. In embodiments that include controls 314 and console 304, the automated luminaire 300 both tracks its movement by monitoring its pan and tilt position, as well as monitoring the operator's manipulations of other light modulating controls.

Figure 8:
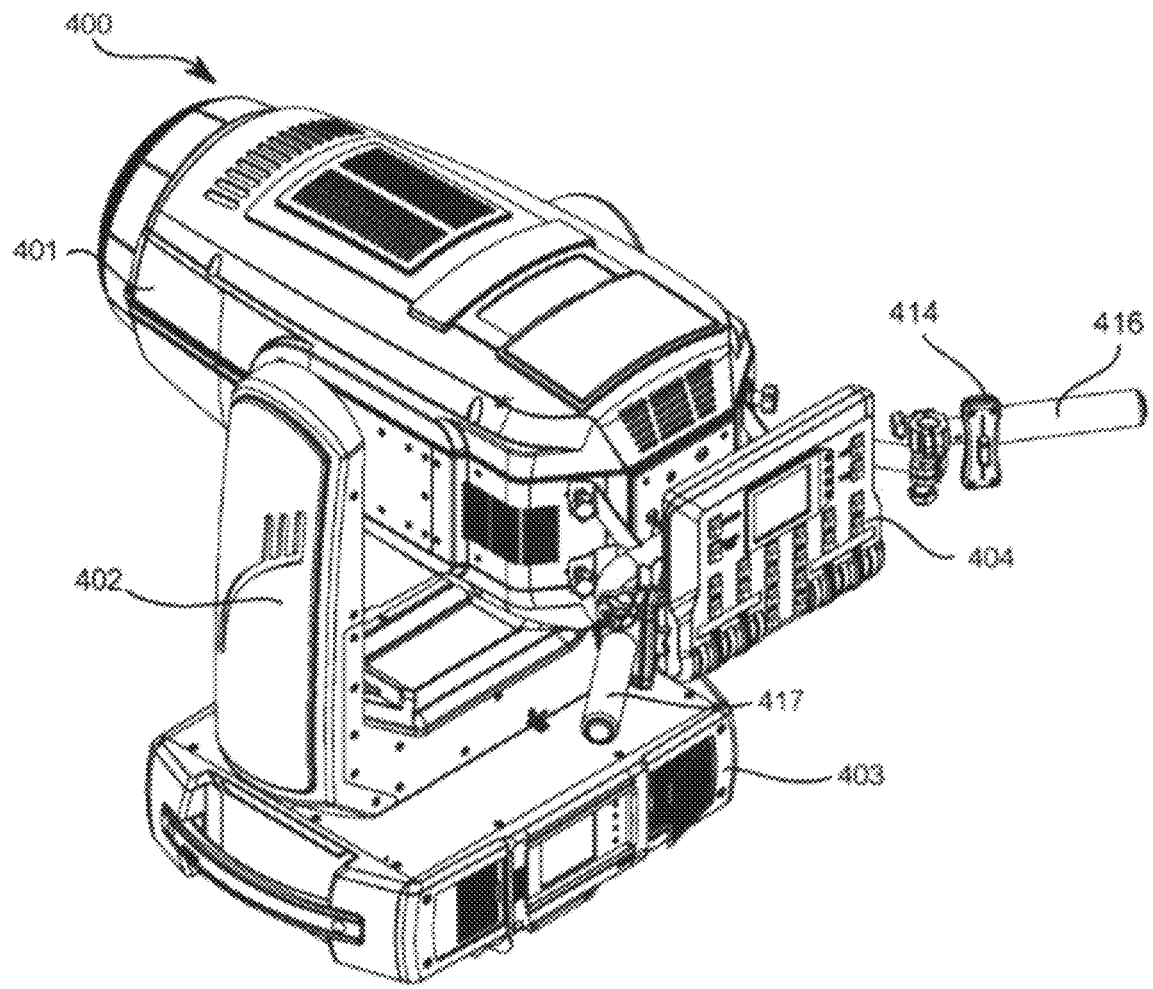
FIG. 8 illustrates a further embodiment of an automated luminaire modified to be used as a follow spot or a follow spot controller.

FIG. 8 illustrates a second embodiment of an automated luminaire 400 that has been modified to be used as a follow spot or as a follow spot controller. A conventional luminaire 400 is modified by adding handles 416 and 417 and overriding the internal motor drives that control pan motion of yoke 402 relative to base 403 and tilt movement of head 401 relative to yoke 402. An operator can direct automated luminaire 400 by grasping the handles 416 and 417 and moving the head 401. In some embodiments, controls 414 and console 404 provide control over further parameters of the luminaire. The operator can thus control the automated luminaire 400 in the same manner as a conventional follow spot. In some embodiments, the automated luminaire 400 may function as a FSC 200 as described with reference to FIG. 2. In such embodiments, sensors in the pan and tilt mechanisms of the automated luminaire 400 sense the operator's movement of the luminaire.

Figure 9:
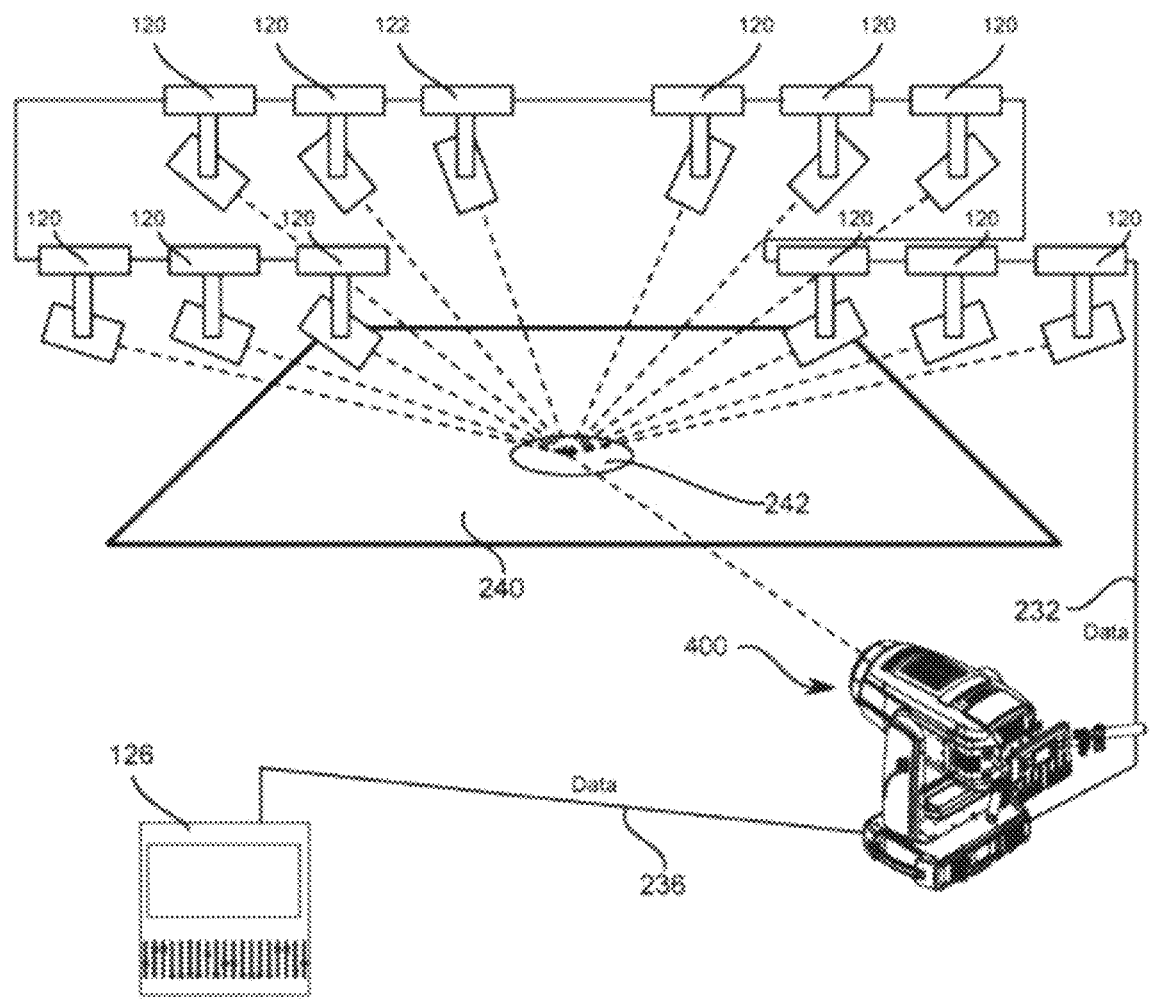
FIG. 9 illustrates a schematic of a further embodiment of a complete remotely controlled follow spot system as it might be installed for a production.

FIG. 9 illustrates a schematic of a second embodiment of a remotely controlled follow spot system according to the disclosure, as it might be installed for a production. Multiple automated luminaires 120 are rigged to illuminate a performance area 240. The control data for the luminaires 120 is routed from a lighting control desk 126 through second lighting control communication link 236 to a combined luminaire and follow spot controller 400 and then via first lighting control communication link 232 to luminaires 120.

In other embodiments, the automated luminaire 300, described with reference to FIG. 7, may be used in the system shown in FIG. 9.

As described previously, an operator of the combined luminaire and follow spot controller 400 may take over control of some or all of the control parameters of one or more of the luminaires 120. In such a circumstance, the automated luminaire becomes a follow spot controller. In particular, combined luminaire and follow spot controller 400 may control the pan and tilt positions of one or more of luminaires 120 such that they are collectively and individually directed to illuminate a target point 242, on performance area 240. Thus the control of automated follow spots can be controlled by the manual control of a single follow spot. Target point 242 may indicate a performer, and the operator may then move the handles on combined luminaire and follow spot controller 400 to illuminate the performer with luminaires 120 as she moves around the performance area 240.

As described briefly with reference to FIG. 2, in some embodiments, a processor, controller, or other control system in a follow spot controller according to the disclosure provides continuous compensation of pan and tilt positions of one or more automated luminaires 120, based on an operator's manipulation of the FSC 200 to control the automated luminaire 122. The control system creates a 3-D model of the performance area 240 (represented by one or more surfaces), and locations and mounting orientations of the automated luminaires 120 and 122 relative to the performance area 240. The 3-D model may also include locations and mounting orientations relative to the performance area 240 of the camera 124 and (where used) the camera 134.

Such a 3-D model may be determined from manual measurements of the surface and locations and mounting orientations. In other embodiments, the extent and locations and mounting orientations may be determined using sensors placed in or on the performance area 240, the automated luminaires 120 and 122, and/or the camera 124. In still other embodiments, the extent and locations and mounting orientations may be determined by the operator moving the center of the light beam projected by the luminaire 122 to each of a plurality of predetermined calibration points in the performance area 240, and indicating to the system the illuminated calibration point.

As the operator moves the luminaire 122 associated with the camera 124, the control system calculates a 3-D vector representing the center of a light beam projected by the luminaire 122. Based on the calculated 3-D vector and, in some embodiments, the location and mounting orientation relative to the performance area 240 of the camera 124, the control system calculates a location of the target point 242 on the performance area 240.

Based on the calculated location of the target point 242 and the locations and mounting orientations relative to the performance area 240 of the automated luminaires 120, the control system calculates individual pan and tilt parameters for each automated luminaire 120 that will result in light beams that also intersect the performance area 240 at the target point 242. These calculations are performed substantially continuously in real time to provide continuous compensation of orientations of the automated luminaires 120, based on the operator's manipulation of the FSC 200.

For the purposes of this disclosure, substantially continuously means sufficiently frequently to prevent perceivably jerky movement of the automated luminaires 120 and/or 122. In some embodiments, such calculated pan and tilt parameters are sent to each automated luminaire 120 at least once every 100 milliseconds. In a preferred embodiment, such calculated pan and tilt parameters are sent to each automated luminaire 120 at least once every 23 milliseconds.

In embodiments where independent camera 134 is used, pan and tilt parameters may also be calculated for the camera 134 that will result in the camera 134 automatically tracking to provide a view of the performance area 240 at the target point 242. Such camera pan and tilt parameters may be recalculated substantially continuously as described above, or with a period comparable to the recalculation of pan and tilt parameters for the automated luminaires 120.

Based on the calculated location of the target point 242 and the location and mounting orientation of the camera relative to the performance area 240 of the automated luminaires 120, the FSC 200 calculates individual pan and tilt parameters for each automated luminaire 120 that will result in light beams that also intersect the performance area 240 at the target point 242.

In some embodiments the FSC 200 (or modified automated luminaire 400) may also control one or more of beam zoom, iris, and light intensity for each controlled automated luminaire 120 or 122. Such control of beam zoom and/or iris would enable the FSC 200 to maintain a constant beam size from each controlled luminaire on a performer as the performer moves within the performance area 240. Further, such control of intensity would enable the FSC 200 to maintain a consistent light intensity on performers as they move within the performance area 240. In applications where the performance is being captured by a video or film camera it is of benefit to maintain a consistent light level on the performer, so that the camera does not have to be adjusted as the performer moves.

In such embodiments, the performer's position establishes a target point 242 in the 3-D model, as calculated from an operator's use of the FSC 200 to point a controlled luminaire at the performer. The FSC 200 may use an initial beam zoom, iris, and/or light intensity for each controlled luminaire, along with a varying throw distance from each controlled luminaire to the calculated moving target point in the 3-D model, to determine changes to make to the beam zoom, iris, and/or light intensity for each controlled luminaire. In such embodiments, an operator of the lighting control desk 126 (or the FSC 200 or modified automated luminaire 400) may choose to allow any one, or any combination, of beam zoom, iris, and light intensity of controlled luminaires to be automatically adjusted by the FSC 200 in order to maintain one or both of beam size and target light intensity, in addition to pan and tilt, for controlled luminaires.

In some embodiments, such a 3-D model is used to provide an operator with a virtual view of the performance area, for example where neither the operator nor any camera has a view of the performance area 240. In various embodiments, such continuous compensation may be provided by a control system in any of FSC 200, modified automated luminaire 300, or modified automated luminaire 400. In other embodiments such continuous compensation is provided by a control system of the lighting control desk 126. In various embodiments, such continuous compensation is enabled and disabled from one of the FSC 200 or lighting control desk 126, and may be enabled for selected ones of the automated luminaires 120.

Figure 10:
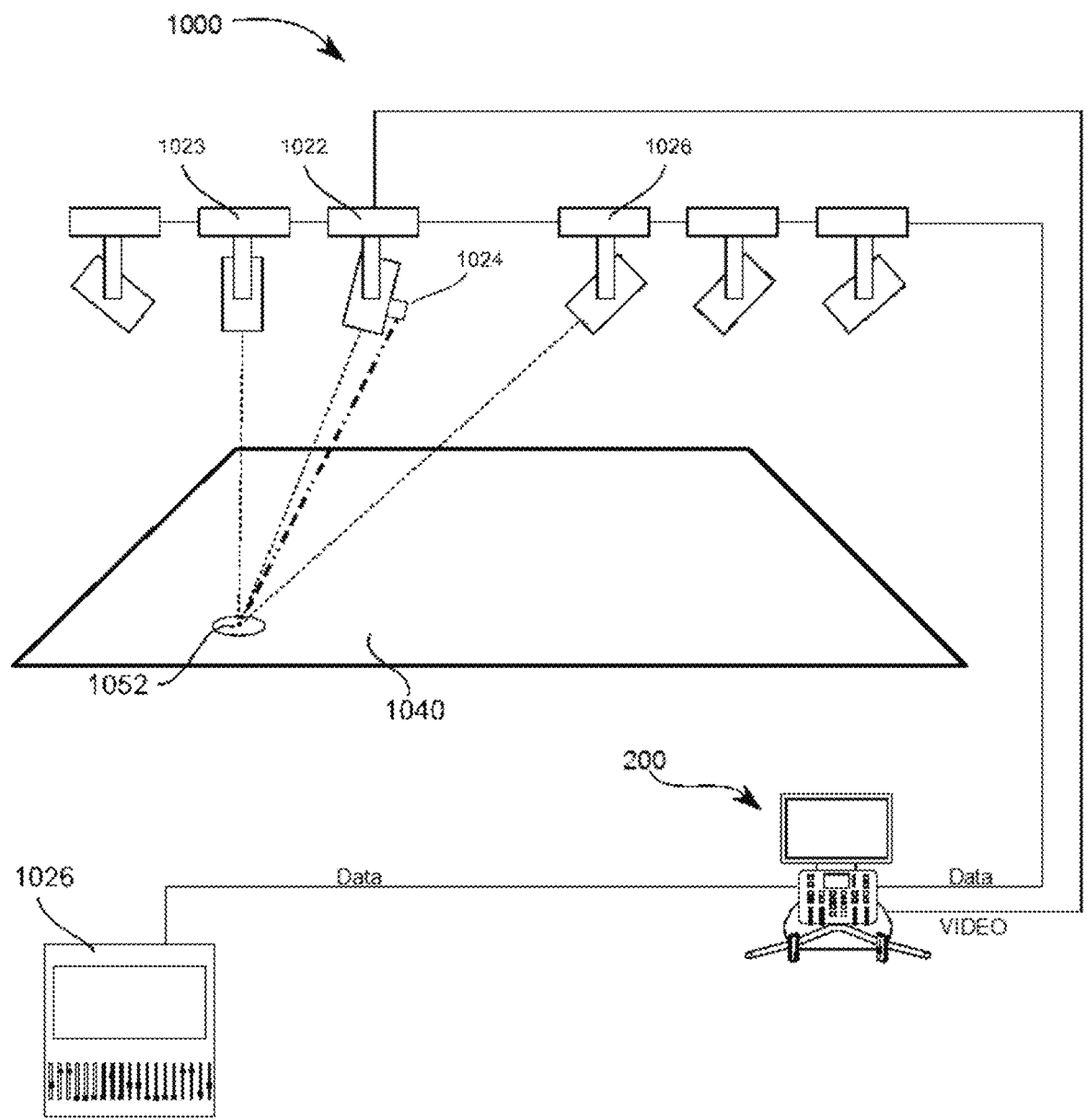
FIGS. 10 and 11 present a schematic view of a remotely controlled follow spot system according to the disclosure in respective first and second configurations during calibration of a 3-D model.
Figure 11:
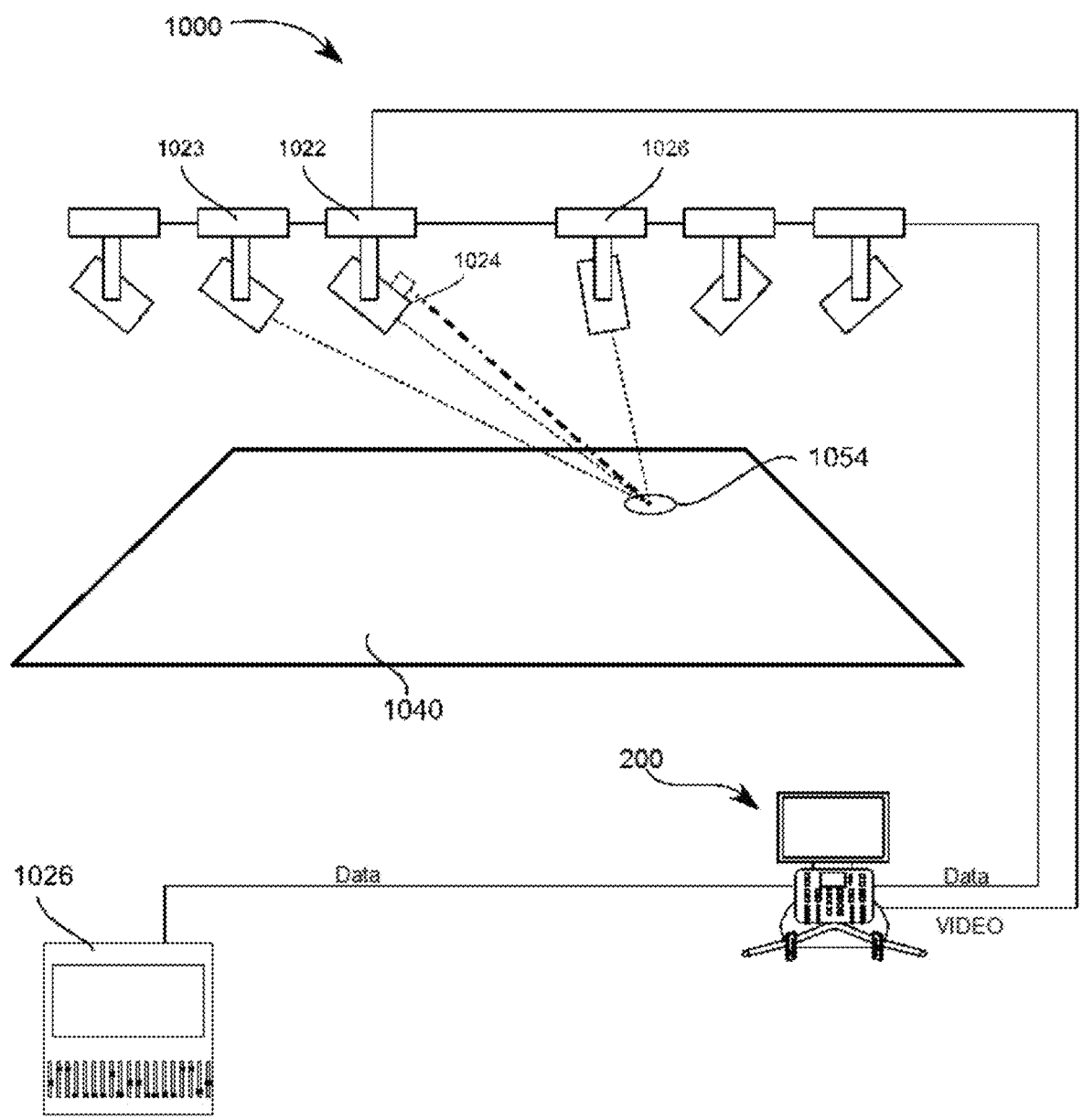

FIGS. 10 and 11 present a schematic view of a remotely controlled follow spot system according to the disclosure in respective first and second configurations during calibration of a 3-D model. FIG. 10 presents a schematic view of an embodiment of the disclosure showing the first stage of a calibration procedure for a remotely controlled follow spot system 1000. For the sake of simplifying the explanation, just three automated luminaires, 1022, 1023, and 1026 (calibration fixtures) are used to calibrate the 3-D model, however the disclosure is not so limited and in practice any number of automated luminaire may be included in the calibration procedure of the 3-D model. In this example, although not required by the disclosure, automated luminaire 1022 is further fitted with a camera 1024 as previously described.

As a first step in the calibration process the operator takes manual and individual control of the calibration fixtures, either using main lighting control desk 1026 or FSC 200. The operator aligns the pan and tilt of each of the calibration fixtures in turn, such that they all point at a common calibration position (or region) 1052 on performance area 1040. The operator may also control the focus and/or spot sizes of the calibration fixtures through the focus and/or zoom control channels such that the beams match in focus and/or size as well as in position.

In some embodiments, the operator positions the automated luminaire 1022 (reference calibration fixture) on the calibration position 1052 using the view from its attached camera 1024. The operator then takes individual control of each of the other calibration fixtures in turn and, observing the view from the camera 1024, moves the beam of each calibration fixture to match position (and possibly focus and/or size) with the beam from the reference calibration fixture. In other embodiments, the operator may directly observe the beams from the calibration fixtures on the performance area 1040 to position the beam from the reference calibration fixture and then operate the other calibration fixtures to match the beam from the reference calibration fixture.

When the calibration fixtures are aligned to the operator's satisfaction, the operator will indicate the completion of the first calibration step to the system and record the first calibration position 1052, using a control on FSC 200 or the main lighting control desk 1026.

Once the first calibration position 1052 is recorded, in a similar series of actions in a second step of the calibration process, the operator repositions the calibration fixtures to a second common calibration position (or region) 1054 on performance area 1040, as shown in FIG. 11. Again, the operator may also control the focus and/or spot sizes of the calibration fixtures through the focus and/or zoom control channels such that the beams match in focus and/or size as well as in position at this second calibration position 1054. When the calibration fixtures are aligned on the calibration position 1054 to the operator's satisfaction, the operator will indicate the completion of the second calibration step to the system and record the second calibration position 1054, through the control on the FSC 200 or the main lighting control desk 1026.

In a final step of the calibration process, the operator activates follow spot control of the calibration fixtures and directs them into various areas of the performance area 1040 using FSC 200, to confirm satisfactory functioning of the follow spot control functionality. If functioning of the follow spot control is not satisfactory, the operator may adjust position, focus, and/or size settings for the calibration fixtures on the calibration positions 1052 and/or 1054, or may repeat the calibration process with one or more additional calibration positions to achieve satisfactory functioning of the follow spot control functionality.

Figure 12:
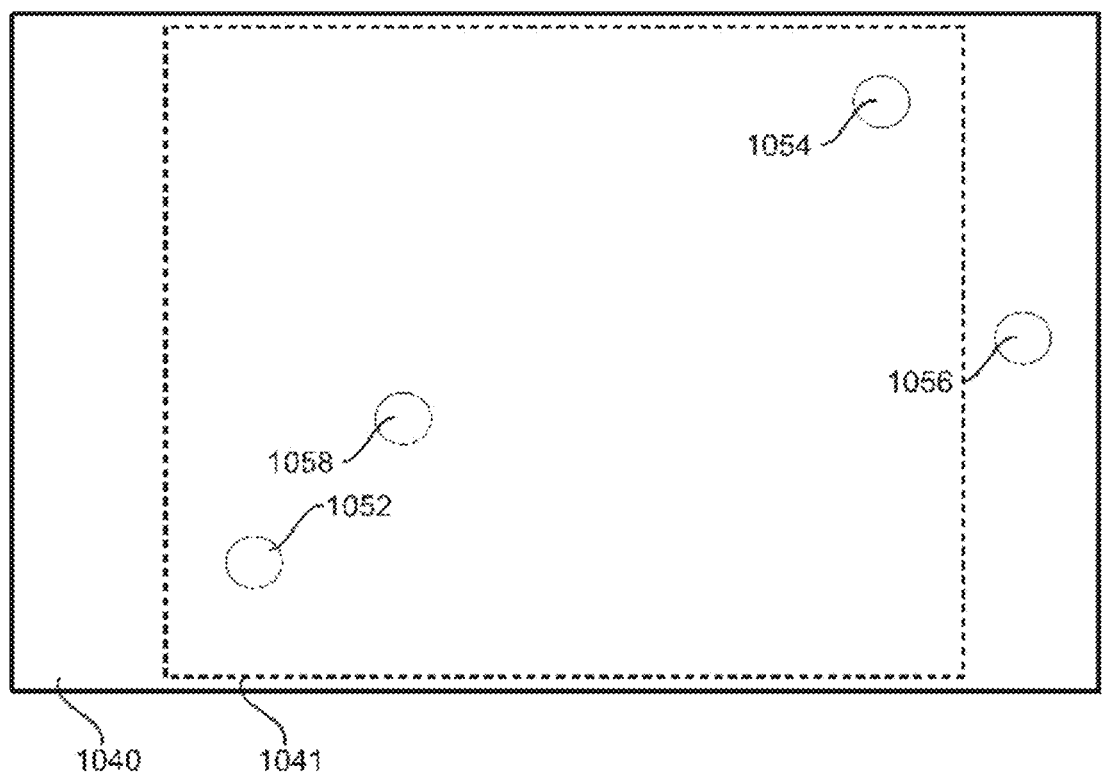
FIG. 12 presents a plan view of a performance area indicating several calibration positions according to the disclosure.

FIG. 12 presents a plan view of a performance area 1040 indicating several calibration positions according to the disclosure. A reduced area 1041 represents a portion of the performance area 1040 where it is desired to use the automated luminaires as follow spots. The areas outside this reduced area 1041 may be the wings or other ancillary areas of a stage where it is not anticipated that the automated luminaires will be used as follow spots.

To improve accuracy of the model calibration, the two calibration positions 1052 and 1054 are preferably selected to be as far apart as possible on the reduced area 1041. Furthermore, they are positioned diagonally from each other across the reduced area 1041, so that both pan and tilt orientations of the calibration fixtures differ between the two calibration positions.

As may be seen in FIG. 12, calibration positions 1052 and 1054 represent two acceptable positions for the calibration procedure, because they are far apart and diagonal to each other. In contrast, position 1056 would not be a suitable calibration position, as it is outside the reduced area 1041. Similarly, although position 1058 is within the reduced area 1041, it would be less suitable as a second calibration position, because it is close to the first calibration position 1052.

While the calibration process has been described for two calibration points on a single horizontal flat surface, it will be understood that the process may additionally or alternatively be used with calibration points on additional horizontal surfaces, on vertical surfaces, or on surfaces at other angles from the horizontal. Additionally, the 3-D model information derived from the calibration process may be combined with information obtained from measuring positions and orientations of automated luminaires and performance areas.

The FSC 200, upon receiving the two calibration positions for each calibration fixtures, may use the pan, tilt, zoom, focus and/or other parameter data for each calibration fixture to create its internal 3-D model of the performance area and the positions of the calibration fixtures relative to that performance area. The calibration system of the FSC 200 may be referred to as the Multi Device Control (MDC) calibration system. Once the MDC system of the FSC 200 is calibrated, the FSC 200 may simultaneously and automatically control automated luminaires included in the MDC calibration process (MDC calibrated fixtures), such that the position, focus, and/or size of their associated light beams converge on a common target point.

Figure 13A:
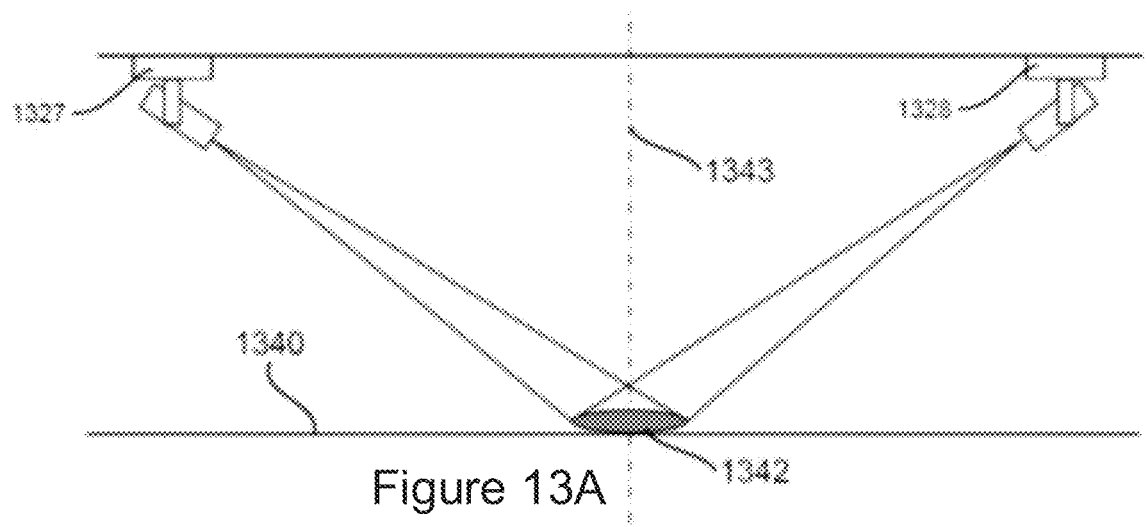
FIGS. 13A, 13B, and 13C illustrate beam height control in a remotely controlled follow spot system according to the disclosure.
Figure 13B:
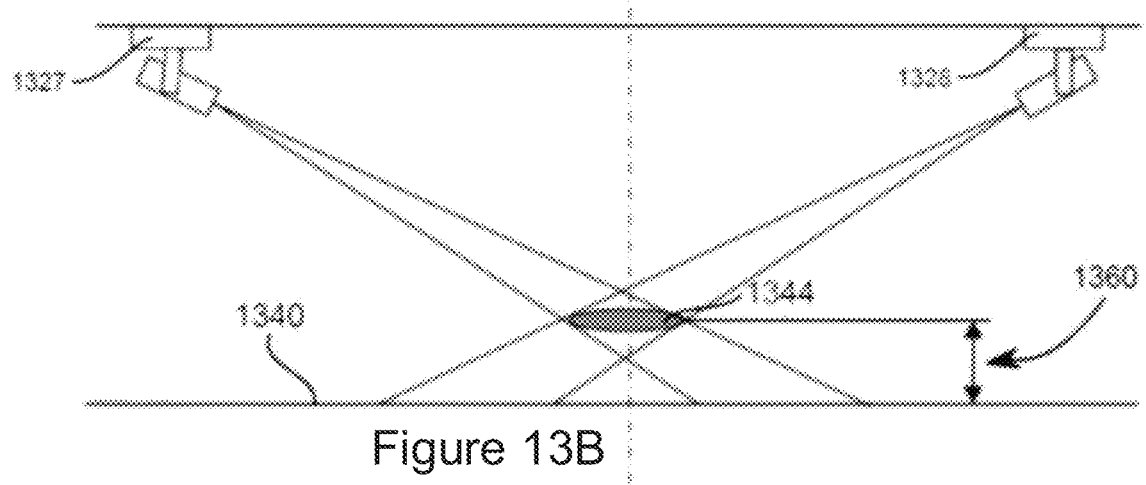
Figure 13C:
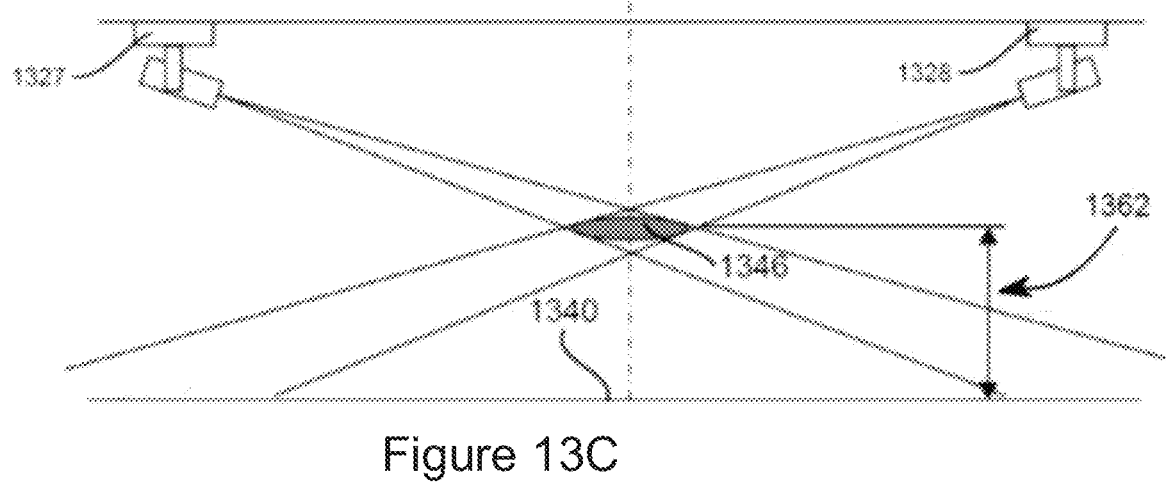

FIGS. 13A, 13B, and 13C illustrate MDC beam height control in a remotely controlled follow spot system according to the disclosure. After undergoing the calibration procedure as described above, the MDC system in FSC 200 can further adjust a height above a target point in a performance area 1340 at which beams from automated luminaires under control of the FSC 200 (controlled fixtures) cross over. The target point may be determined by physical movement of the FSC 200 (as described with reference to FIG. 3) or by selection of a preset target point (as described below with reference to FIG. 15). This height adjustment occurs in response to a received height control signal, for example, a setting of a height control input device of the FSC 200, or a control signal received from an external device such as a lighting control desk.

In one example, this height adjustment might be made to adapt to a performer's height. Using this MDC height control, an operator may adjust the height of the crossover region above a performance area 1340 so that it coincides with a performer's head, upper body, or any other desired position. In FIGS. 13A, 13B, and 13C, automated luminaires 1327 and 1328 are the controlled fixtures, however the disclosure is not so limited and in practice any number of the MDC calibrated fixtures may be controlled fixtures.

FIG. 13A shows the controlled fixtures being sent pan and tilt parameters by the FSC 200 (not shown) to point at a target point 1342, which is on the surface of the performance area 1340 based on a first setting of the height control input. Using the height control input, an operator may raise or lower the crossover region above or below a surface of the performance area 1340.

FIG. 13B shows the controlled fixtures being sent height-adjusted pan and tilt parameters that cause their beams to crossover in a region 1344 which is at height 1360 above the surface of the performance area 1340. The height 1360 is based on a second setting of the height control input. Note that the upstage/downstage and stage left/stage right positions of the region 1344 are the same as that of target point 1342—both the target point 1342 and the region 1344 are on vertical line 1343, only the height of the region 1344 has changed relative to the target point 1342.

Similarly, FIG. 13C shows the controlled fixtures being sent height-adjusted pan and tilt parameters that cause their beams to crossover in a region 1346 which is at a height 1362 above the surface of the performance area 1340. The height 1362 is based on a third setting of the height control input and only the height of the region 1346 has changed relative to the target point 1342 and the region 1344.

The systems described herein provide a lighting operator with full control over the use of multiple automated luminaires as follow spots, using a remote camera to provide direct feedback to a screen in front of the operator. However, a camera system may introduce a time delay and the image the operator sees on the screen may lag the real movement on stage by a noticeable amount. For a fast-moving performer, this delay may cause the operator to direct the automated luminaires to a desired position a little too late, resulting in the automated luminaires either falling behind the performer as they move, or overshooting the performer when the performer stops moving. The present disclosure provides functionality to deal with this delay and allow the operator to accurately position the luminaires.

Figure 14:
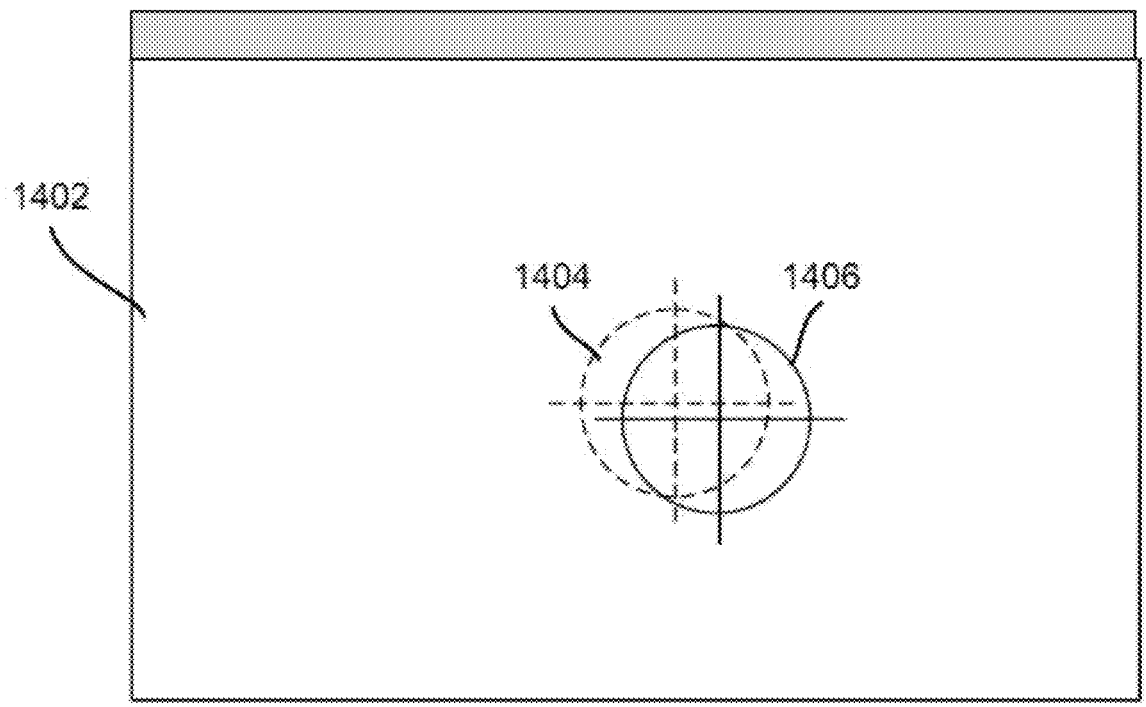
FIG. 14 presents a first video display of a remotely controlled follow spot system according to the disclosure.

FIG. 14 presents a first video display 1402 of a remotely controlled follow spot system according to the disclosure. Such a display may be provided on display screen 202 by any of the remotely controlled follow spot controllers described herein. The first video display 1402 is situated on or near to the FSC 200 and may provide the delayed view from the remote camera to the operator. The FSC 200 superimposes over the first video display 1402 a trace cursor 1404, which indicates a location of a current target point on a representation of the performance area 240 shown on the first video display 1402. The trace cursor 1404 indicates the target point that the automated luminaires under the control of the FSC 200 (controlled fixtures) are being commanded to move to.

Because the trace cursor 1404 is being generated locally, it is not subject to the time delay that the camera system exhibits. Thus, the trace cursor 1404 accurately shows the operator the target point on the performance area 240 where the FSC 200 is instructing the controlled fixtures to point. In contrast, the displayed image from the camera shows the controlled luminaires' positions with some delay. The trace cursor 1404 is generated from the operator's control inputs to the FSC 200, using the internal 3-D model of performance area and automated luminaires that was generated by the MDC calibration procedure described above. The trace cursor 1404 provides a significant advantage to the operator in maintaining a live and continuous accurate positioning of the controlled fixtures on a moving performer.

The first video display 1402 also superimposes a position cursor 1406 on the screen, indicating a position representative of actual current positions on the performance area 240 of the controlled fixtures. These may differ from the target point shown by the trace cursor 1404 for at least two reasons. In a first example, there may be some delay in physically moving the controlled fixtures from their previous positions to the target point indicated by the trace cursor 1404, so the position cursor 1406 may lag slightly behind the trace cursor 1404. Sources of such delay may include position encoder processing delays; fixture movement processing and movement interpolation; physical limits of the fixtures such as maximum movement speed, acceleration, and/or deceleration; video signal processing and/or recording; and operator reaction delays. Where first lighting control communication link 232 between the FSC 200 and the controlled fixtures is a bidirectional link, the controlled fixtures may report their current pan and tilt positions to the FSC 200, which may use those reported positions to create the position cursor 1406.

In a second example, the controlled fixtures may be under the control of the main lighting control desk 126 or 1026 or another control source, and the pan and tilt positions for the controlled fixtures is being received and passed through unchanged by the FSC 200. In this example, the controlled fixtures are not currently under control of the FSC 200. In such circumstances, the position cursor 1406 will show where the main controller is positioning the controlled fixtures. The operator may move the target point, shown by the trace cursor 1404, close to the actual position of the controlled fixtures, shown by the position cursor 1406. The operator might do this, for example, in preparation for resuming control of the controlled fixtures, so that resumption of control by the FSC 200 is smoother and causes less of a jump in the controlled fixtures' positions when control resumes.

In both examples, the FSC 200 calculates from the received pan and tilt information a position on the performance area 240 for the light beam from each controlled fixture. The FSC 200 then calculates a position on the performance area 240 that represents the aggregate positions of the controlled fixtures. The FSC 200 then superimposes the position cursor 1406 over a location of the representative position on the representation of the performance area 240 shown on the first video display 1402.

In one embodiment, the trace cursor 1404 may be colored blue on the screen and the position cursor 1406 may be colored red on the screen. In other embodiments, solid and dashed lines or other graphical differences may be used to distinguish between the two cursors. As described above, the trace and position cursors 1404 and 1406 are superimposed over a display that includes a representation of the performance area 240 or 1340, which may be a virtual display generated from a 3-D model; a video feed received from a camera mounted on an automated fixture, mounted in its own PTZ system, or mounted in a static position; or any other suitable visual representation.

Figure 15:
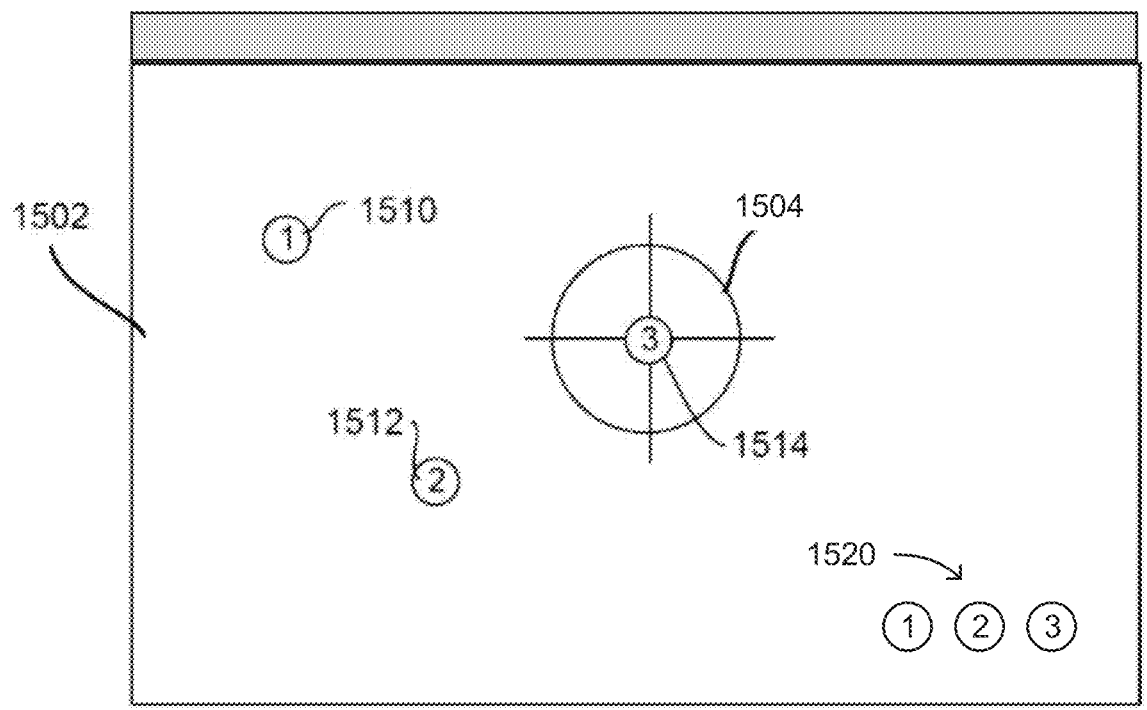
FIG. 15 presents a second video display of a remotely controlled follow spot system according to the disclosure.

FIG. 15 presents a second video display 1502 of a remotely controlled follow spot system according to the disclosure. In some embodiments the FSC 200 includes the ability to store (or record) one or more preset target points on the performance area 240 for the automated luminaires under its control (controlled fixtures). These preset target points may be fixed target points on a performance area that will need to be illuminated frequently, such as a microphone position or a lectern position. In some embodiments additional parameters such as zoom, focus, and/or intensity may be recorded along with the position of the target point in the performance area 240.

The video display 1502 shows preset target point icons 1510, 1512, and 1514 superimposed over a video or virtual display of a performance area, each associated with a corresponding recorded target point. When an operator selects one of these preset target point icons using a touch control on the display, a preset target control, a received control signal, or other control input on the FSC 200, the controlled fixtures will be automatically repositioned to the selected preset target point. In some embodiments, the zoom, focus, intensity, and/or other parameters of the controlled fixtures may also be automatically set when a preset target point is selected. In the configuration shown in video display 1502, preset position 3 (labeled 1514) has been selected by the operator and the controlled fixtures are now directed to the position 1514, as shown by cursor 1504.

Preset target point icons represent locations on the performance area 240 and in the 3-D model built up via the MDC calibration process. As the operator uses the 3-D model and follow spot functionality of the FSC 200 to control the controlled fixtures, the displayed view from the camera 124 (or the virtual view) may move across the performance area 240. The FSC 200 will display a preset target point icon as the location the icon represents becomes visible on the display screen 202, and will move the preset target point icon as its location moves within the display.

The second video display 1502 may also include a preset position panel 1520. The icons of the preset position panel 1520 are superimposed over the performance area display of the second video display 1502, are each associated with a corresponding recorded target point, and may be actuated using a touch control on the display or other control input. However, the icons of the preset position panel 1520 are not displayed over corresponding locations on the performance area 240 and do not move as their corresponding locations move within the display. The preset position panel 1520 remains visible even if the viewpoint of the second video display 1502 has moved such that one or more recorded target points are no longer visible in the second video display 1502.

Figure 16A:
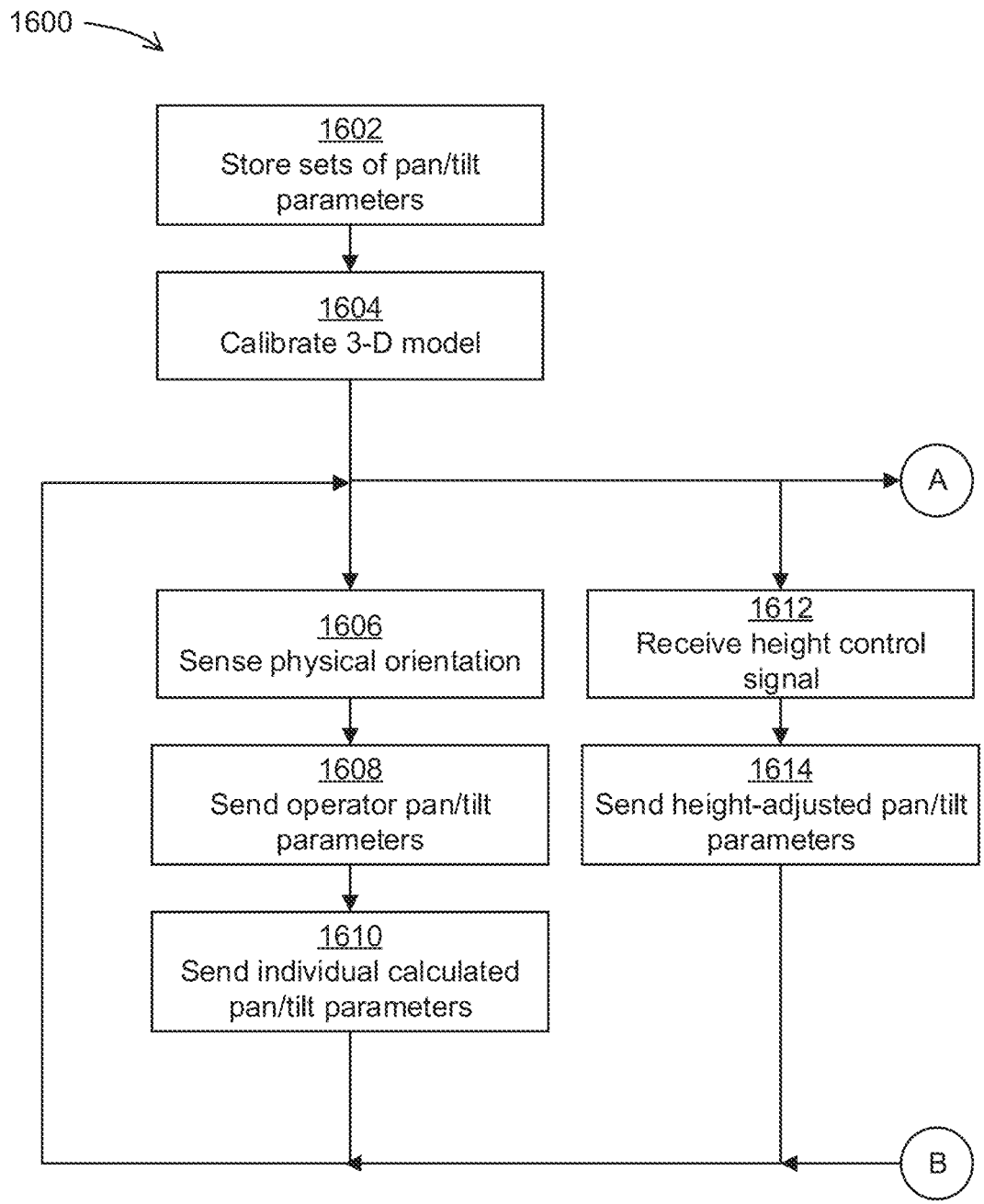
FIGS. 16A and 16B illustrate a process of controlling a plurality of automated luminaires according to the disclosure.
Figure 16B:
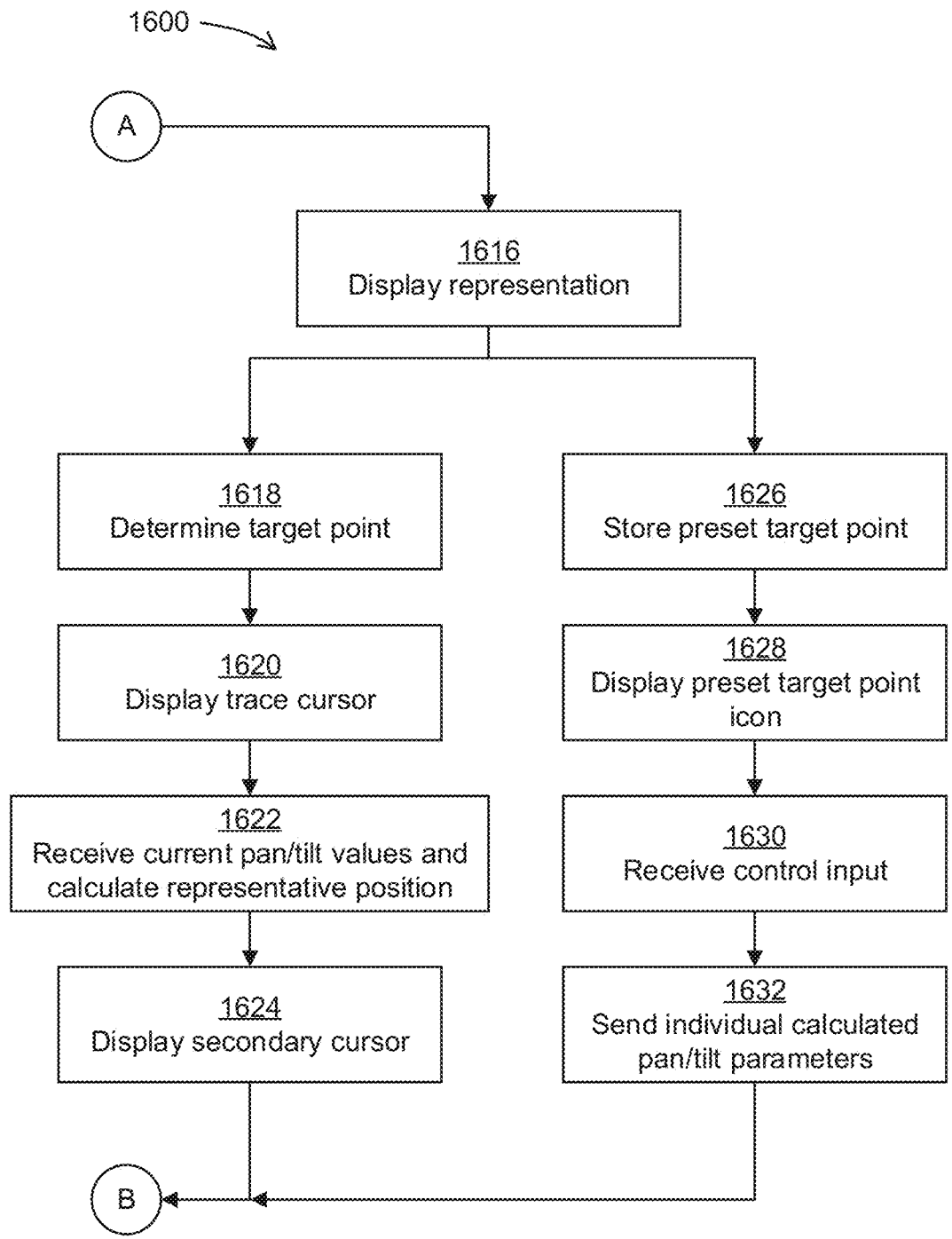

FIGS. 16A and 16B illustrate a process 1600 of controlling a plurality of automated luminaires according to the disclosure. The process 1600 may be performed by the FSC 200, the FSC 300, the FSC 400, or any other follow spot controller according to the disclosure. In step 1602, first and second sets of individual pan and tilt parameters for each of a plurality of automated luminaires are stored in a memory of the FSC 200. In other embodiments, first and second sets of individual focus or size parameters associated respectively with the first and second sets of pan and tilt parameters for each of the plurality of automated luminaires may also be stored in the memory. In step 1604, a 3-D model is calibrated based on the stored first and second sets of individual pan and tilt parameters and, if used, the stored first and second sets of individual focus or size parameters. The 3-D model is a model of a surface of a performance area and locations and mounting orientations of the plurality of automated luminaires relative to the performance area. From step 1604, the process goes in parallel to steps 1606, 1612, and 1616.

In step 1606, a change in physical orientation of the FSC 200 is sensed. In step 1608, operator pan and tilt parameters are sent to a first automated luminaire of the plurality of automated luminaires, the operator pan and tilt parameters based on the sensed change in the physical orientation of the follow spot controller. In step 1610, individual calculated pan and tilt parameters are sent to each of the remainder of the plurality of automated luminaires, the individual calculated pan and tilt parameters based on (i) the operator pan and tilt parameters of the first automated luminaire and (ii) the 3-D model. After step 1610, the process returns in parallel to steps 1606, 1612, and 1616.

In step 1612, a height control signal is received by the FSC 200. In some embodiments, the height control signal may be received from an input device of the FSC 200, or as a control signal received from an external device such as a lighting control desk. In step 1614, height-adjusted pan and tilt parameters are sent to the plurality of automated luminaires, the height-adjusted pan and tilt parameters based on a target point of the plurality of automated luminaires, the 3-D model, and a value of the height control signal. After step 1614, the process returns in parallel to steps 1606, 1612, and 1616.

In step 1616, a representation of the performance area is displayed on a display screen of the FSC 200. In various embodiments, the representation is a virtual display generated from the 3-D model, or a video feed received from a camera mounted on an automated fixture, mounted in its own PTZ system, or mounted in a static position. From step 1616, the process goes in parallel to steps 1618 and 1626.

In step 1618, a target point on the performance area is determined from the operator pan and tilt parameters and the 3-D model. In step 1620, a trace cursor is displayed on the display screen, where the trace cursor indicates a location of the target point in the representation of the performance area. In step 1622, information relating to current pan and tilt values for the plurality of automated luminaires is received by the FSC 200, and a representative position on the performance area is calculated from the received current pan and tilt values and the 3-D model. In various embodiments, the information relating to current pan and tilt values may be received directly from the plurality of automated luminaires or from a lighting desk controlling the plurality of automated luminaires. In step 1624, a position cursor is displayed on the display screen, indicating a location of the representative position in the representation of the performance area. Steps 1622 and 1624 are optional, and may be omitted in some embodiments. After step 1624 (or step 1620), the process returns in parallel to steps 1606, 1612, and 1616.

In step 1626, a preset target point on the performance area is stored in the memory. In step 1628, an icon is displayed on the display screen, the icon indicating a location of the stored target point in a representation of the performance area. In step 1630, a control input selecting the preset target point is received by the FSC 200. In step 1632, individual calculated pan and tilt parameters are sent to each of the plurality of automated luminaires, where the individual calculated pan and tilt parameters are based on the selected preset target point and the 3-D model.

While the disclosure has been described with respect to a limited number of embodiments, those skilled in the art, having benefit of this disclosure, will appreciate that other embodiments may be devised which do not depart from the scope of the disclosure herein. The disclosure has been described in detail, it should be understood that various changes, substitutions and alterations can be made hereto without departing from the spirit and scope of the disclosure.

What is claimed is:

1. A follow spot control system, comprising:
    a memory;
    a processor electrically coupled to the memory and configured to execute instructions received from the memory;
    a mounting mechanism configured to mount a follow spot controller for motion in at least pan and tilt axes of movement; and
    a communication interface electrically coupled to the processor, the communication interface configured to communicate with a plurality of automated luminaires,
    wherein the processor is further configured to:
        store in the memory first and second sets of individual pan and tilt parameters for each of the plurality of automated luminaires;
        calibrate individual locations and mounting orientations of the plurality of automated luminaires relative to a surface of a performance area in a three-dimensional (3-D) model of (i) the surface of the performance area and (ii) the individual locations and mounting orientations of the plurality of automated luminaires relative to the performance area, where the individual locations and mounting orientations of the plurality of automated luminaires are calibrated based on the stored first and second sets of individual pan and tilt parameters;
        sense a change in a physical orientation of the mounting mechanism in the at least pan and tilt axes of movement,
        send operator pan and tilt parameters to a first automated luminaire of the plurality of automated luminaires via the communication interface, the operator pan and tilt parameters based on the sensed change in the physical orientation of the mounting mechanism in the at least pan and tilt axes of movement, and
        send individual calculated pan and tilt parameters to each of the remainder of the plurality of automated luminaires via the communication interface, the individual calculated pan and tilt parameters based on (i) the operator pan and tilt parameters of the first automated luminaire and (ii) the 3-D model.

2. The follow spot control system of claim 1, wherein the processor is configured to:
    store in the memory first and second sets of individual focus or size parameters associated respectively with the first and second sets of pan and tilt parameters for each of the plurality of automated luminaires;
    calibrate the 3-D model based on the stored first and second sets of individual focus or size parameters;
    send an operator focus or size parameter to the first automated luminaire of the plurality of automated luminaires via the communication interface, the operator focus or size parameter based on the 3-D model and the sensed change in the physical orientation of the mounting mechanism in the at least pan and tilt axes of movement, and
    send individual calculated focus or size parameters to each of the remainder of the plurality of automated luminaires via the communication interface, the individual calculated focus or size parameters based on (i) the operator pan and tilt parameters of the first automated luminaire and (ii) the 3-D model.

3. The follow spot control system of claim 1, wherein the processor is configured to:
    store a third set of individual pan and tilt parameters for each of the plurality of automated luminaires; and
    calibrate the 3-D model based on the stored third set of individual pan and tilt parameters.

4. The follow spot control system of claim 1, wherein the first set of individual pan and tilt parameters are configured to point the plurality of automated luminaires at a common first calibration region of a performance area and the second set of individual pan and tilt parameters are configured to point the plurality of automated luminaires at a second calibration region of the performance area.

5. The follow spot control system of claim 4, wherein the performance area is a horizontal surface.

6. The follow spot control system of claim 1, wherein the processor is configured to:
receive a height control signal; and
send height-adjusted pan and tilt parameters to the plurality of automated luminaires via the communication interface, the height-adjusted pan and tilt parameters based on a target point of the plurality of automated luminaires, the 3-D model, and a value of the height control signal.

7. The follow spot control system of claim 1, further comprising a display screen, wherein the processor is configured to:
display a representation of the performance area on the display screen;
determine from the operator pan and tilt parameters and the 3-D model a target point on the performance area; and
display a trace cursor on the display screen, the trace cursor indicating a location of the target point in the representation of the performance area.

8. The follow spot control system of claim 7, wherein the representation of the performance area is a live video image of the performance area.

9. The follow spot control system of claim 7, wherein the processor is configured to:
receive information relating to current pan and tilt values for the plurality of automated luminaires;
calculate from the received current pan and tilt values and the 3-D model a representative position on the performance area; and
display a position cursor on the display screen, indicating a location of the representative position in the representation of the performance area.

10. The follow spot control system of claim 9, wherein the processor is configured to receive the information relating to current pan and tilt values from the plurality of automated luminaires via the communication interface.

11. The follow spot control system of claim 1, further comprising a display screen, wherein the processor is configured to:
display a representation of the performance area on the display screen;
store in the memory a preset target point on the performance area; and
display an icon on the display screen, the icon indicating a location of the stored preset target point in the representation of the performance area.

12. The follow spot control system of claim 11, wherein the processor is configured to:
receive a control input selecting the preset target point; and
send individual calculated pan and tilt parameters to each of the plurality of automated luminaires via the communication interface, where the individual calculated pan and tilt parameters are based on the selected preset target point and the 3-D model.

13. A method of controlling a plurality of automated luminaires, comprising:

storing in a memory first and second sets of individual pan and tilt parameters for each of the plurality of automated luminaires;
calibrating a three-dimensional (3-D) model of (i) a surface of a performance area and (ii) locations and mounting orientations of the plurality of automated luminaires relative to the performance area, where the calibration is based on the stored first and second sets of individual pan and tilt parameters;
sensing a change in physical orientation of a mounting mechanism in at least pan and tilt axes of movement, the mounting mechanism configured to mount a follow spot controller,
sending operator pan and tilt parameters to a first automated luminaire of the plurality of automated luminaires, the operator pan and tilt parameters based on the sensed change in the physical orientation of the mounting mechanism, and
sending individual calculated pan and tilt parameters to each of the remainder of the plurality of automated luminaires, the individual calculated pan and tilt parameters based on (i) the operator pan and tilt parameters of the first automated luminaire and (ii) the 3-D model.

14. The method of claim 13, further comprising:
storing in the memory first and second sets of individual focus or size parameters associated respectively with the first and second sets of pan and tilt parameters for each of the plurality of automated luminaires;
calibrating the 3-D model based on the stored first and second sets of individual focus or size parameters;
sending an operator focus or size parameter to the first automated luminaire of the plurality of automated luminaires, the operator focus or size parameter based on the sensed change in the physical orientation of the mounting mechanism and the 3-D model, and
sending individual calculated focus or size parameters to each of the remainder of the plurality of automated luminaires via a communication interface, the individual calculated focus or size parameters based on (i) the operator pan and tilt parameters of the first automated luminaire and (ii) the 3-D model.

15. The method of claim 13, further comprising:
receiving a height control signal; and
sending height-adjusted pan and tilt parameters to the plurality of automated luminaires, the height-adjusted pan and tilt parameters based on a target point of the plurality of automated luminaires, the 3-D model, and a value of the height control signal.

16. The method of claim 13, further comprising:
displaying a representation of the performance area on a display screen;
determining from the operator pan and tilt parameters and the 3-D model a target point on the performance area; and
displaying a trace cursor on the display screen, the trace cursor indicating a location of the target point in the representation of the performance area.

17. The method of claim 16, further comprising:
receiving information relating to current pan and tilt values for the plurality of automated luminaires;
calculating from the received current pan and tilt values and the 3-D model a representative position on the performance area; and
displaying a position cursor on the display screen, indicating a location of the representative position in the representation of the performance area.

18. The method of claim 17, wherein the information relating to current pan and tilt values is received from the plurality of automated luminaires.

19. The method of claim 13, further comprising:
   displaying a representation of the performance area on a display screen;
   storing in the memory a preset target point on the performance area; and
   displaying an icon on the display screen, the icon indicating a location of the stored preset target point in a representation of the performance area.

20. The method of claim 19, further comprising:
   receiving a control input selecting the preset target point; and
   sending individual calculated pan and tilt parameters to each of the plurality of automated luminaires, where the individual calculated pan and tilt parameters are based on the selected preset target point and the 3-D model.

\* \* \* \* \*